(12) United States Patent
Roan et al.

(10) Patent No.: US 12,049,980 B1
(45) Date of Patent: Jul. 30, 2024

(54) SYSTEM FOR SECURING AN ELONGATED MEMBER

(71) Applicant: Art Guild of Philadelphia, Inc., West Deptford, NJ (US)

(72) Inventors: Joseph Michael Roan, Media, PA (US); Charles C. Alpert, Rumson, NJ (US); Ivan Letinic, Ridgefield, NJ (US); Douglas Zegel, Mount Laurel, NJ (US)

(73) Assignee: Art Guild of Philadelphia, Inc., West Deptford, NJ (US)

( * ) Notice: Subject to any disclaimer, the term of this patent is extended or adjusted under 35 U.S.C. 154(b) by 0 days.

(21) Appl. No.: 18/188,858

(22) Filed: Mar. 23, 2023

Related U.S. Application Data

(63) Continuation-in-part of application No. 17/396,365, filed on Aug. 6, 2021, now Pat. No. 11,624,472.

(51) Int. Cl.
| | |
|---|---|
| *F16M 11/04* | (2006.01) |
| *A47F 5/13* | (2006.01) |
| *F16M 11/16* | (2006.01) |
| *F16M 13/02* | (2006.01) |

(52) U.S. Cl.
CPC ............... *F16M 11/04* (2013.01); *A47F 5/13* (2013.01); *F16M 11/16* (2013.01); *F16M 13/02* (2013.01)

(58) Field of Classification Search
CPC ........ F16M 11/04; F16M 11/16; F16M 13/02; A75F 5/13
See application file for complete search history.

(56) References Cited

U.S. PATENT DOCUMENTS

| | | | |
|---|---|---|---|
| 446,640 A | 2/1891 | Dennis | |
| 544,166 A | 8/1895 | Gregory | |
| 805,570 A | 11/1905 | Maldaner | |
| 1,227,019 A | 5/1917 | Thompson | |
| 1,752,683 A | 4/1930 | Meagher | |
| 2,443,149 A | 6/1948 | Rundell | |
| 2,657,894 A | 11/1953 | Sklenar | |
| 3,062,157 A | 11/1962 | Woods | |
| 3,570,412 A | 3/1971 | Holman, Jr. | |
| 3,738,650 A | 6/1973 | Ossenkop et al. | |
| 3,865,336 A | 2/1975 | Robertson | |
| 3,891,091 A | 6/1975 | Anderson | |
| 3,947,987 A * | 4/1976 | Allen .................. | G09F 15/0081 |
| | | | 40/493 |
| 4,405,127 A | 9/1983 | Miller | |
| 4,509,881 A | 4/1985 | Welch | |
| 4,688,686 A | 8/1987 | Mitts et al. | |
| 4,700,918 A | 10/1987 | Andrasko, Jr. | |
| 5,127,528 A | 7/1992 | Cone | |
| 5,197,642 A | 3/1993 | Cortelli | |
| 5,894,610 A | 4/1999 | Winter | |
| 6,845,955 B1 | 1/2005 | Hsu | |
| 7,167,103 B2 | 1/2007 | Warren et al. | |
| 7,346,940 B1 | 3/2008 | Liao | |
| 7,762,508 B2 | 7/2010 | Xu | |

(Continued)

*Primary Examiner* — Eret C McNichols
(74) *Attorney, Agent, or Firm* — Volpe Koenig

(57) ABSTRACT

A devise for adjusting the orientation of a display on a support. The devise has a first portion with a non-circular interior opening, and a second portion with a non-circular exterior shaped to nest within the non-circular interior opening of the first portion and aligns a display support in a desired orientation.

22 Claims, 26 Drawing Sheets

(56) References Cited

U.S. PATENT DOCUMENTS

| | | |
|---|---|---|
| 7,946,543 B2 | 5/2011 | Cotter et al. |
| 8,069,508 B2 | 12/2011 | O'Connell |
| 8,157,231 B2 | 4/2012 | Shiu et al. |
| 8,214,938 B2 | 7/2012 | Hanley et al. |
| 8,459,474 B2 | 6/2013 | Sagel |
| 8,528,753 B2 | 9/2013 | Woolley, II |
| 8,613,152 B2 | 12/2013 | Suciu et al. |
| 8,806,670 B2 | 8/2014 | O'Connell |
| 8,978,228 B2 | 3/2015 | Didehvar et al. |
| 8,991,625 B2 | 3/2015 | Bucklew et al. |
| 9,271,592 B2 | 3/2016 | Didehvar et al. |
| 9,271,593 B1 | 3/2016 | Chang |
| 9,427,612 B1 | 8/2016 | Swanson |
| 9,538,861 B2 | 1/2017 | Young et al. |
| 9,554,674 B2 | 1/2017 | Forrest et al. |
| 10,051,985 B2 | 8/2018 | Jones |
| 10,327,545 B2 | 6/2019 | McPhillips |
| 10,694,844 B1 | 6/2020 | Smed |
| 10,702,086 B1 | 7/2020 | Sayed |
| 11,083,286 B2 * | 8/2021 | Seyfried ................. F16M 13/00 |
| 11,164,487 B1 | 11/2021 | Roan et al. |
| 11,222,558 B2 | 1/2022 | Wicken et al. |
| 11,306,492 B2 * | 4/2022 | Chevis .................... E21D 11/10 |
| 11,317,752 B2 | 5/2022 | Arnold et al. |
| 11,445,821 B2 | 9/2022 | Sagel |
| 11,762,425 B1 * | 9/2023 | Roan ....................... G06F 1/1637 |
| | | 345/1.3 |
| 2003/0164431 A1 * | 9/2003 | Kanashiki ............ F16M 11/046 |
| | | 248/157 |
| 2006/0186284 A1 * | 8/2006 | Root ....................... F16M 11/10 |
| | | 248/161 |
| 2009/0020671 A1 * | 1/2009 | Xu ............................ A47K 3/38 |
| | | 4/558 |
| 2009/0114786 A1 * | 5/2009 | Meyer .................... F16M 11/28 |
| | | 70/20 |
| 2011/0147326 A1 * | 6/2011 | Woolley, II .............. A47K 3/38 |
| | | 211/105.6 |
| 2012/0145661 A1 * | 6/2012 | Fernandez ............. A47B 96/06 |
| | | 248/251 |
| 2013/0334156 A1 * | 12/2013 | Baines ................... A47K 3/281 |
| | | 211/134 |
| 2015/0143729 A1 * | 5/2015 | Pyc ............................ G09F 7/18 |
| | | 40/607.1 |
| 2020/0152097 A1 * | 5/2020 | Yumoto .................. G02B 27/06 |
| 2021/0134193 A1 * | 5/2021 | Pan .......................... F21V 21/00 |
| 2021/0256884 A1 | 8/2021 | Reiner |
| 2022/0270524 A1 * | 8/2022 | Innis ................... G09F 15/0018 |

* cited by examiner

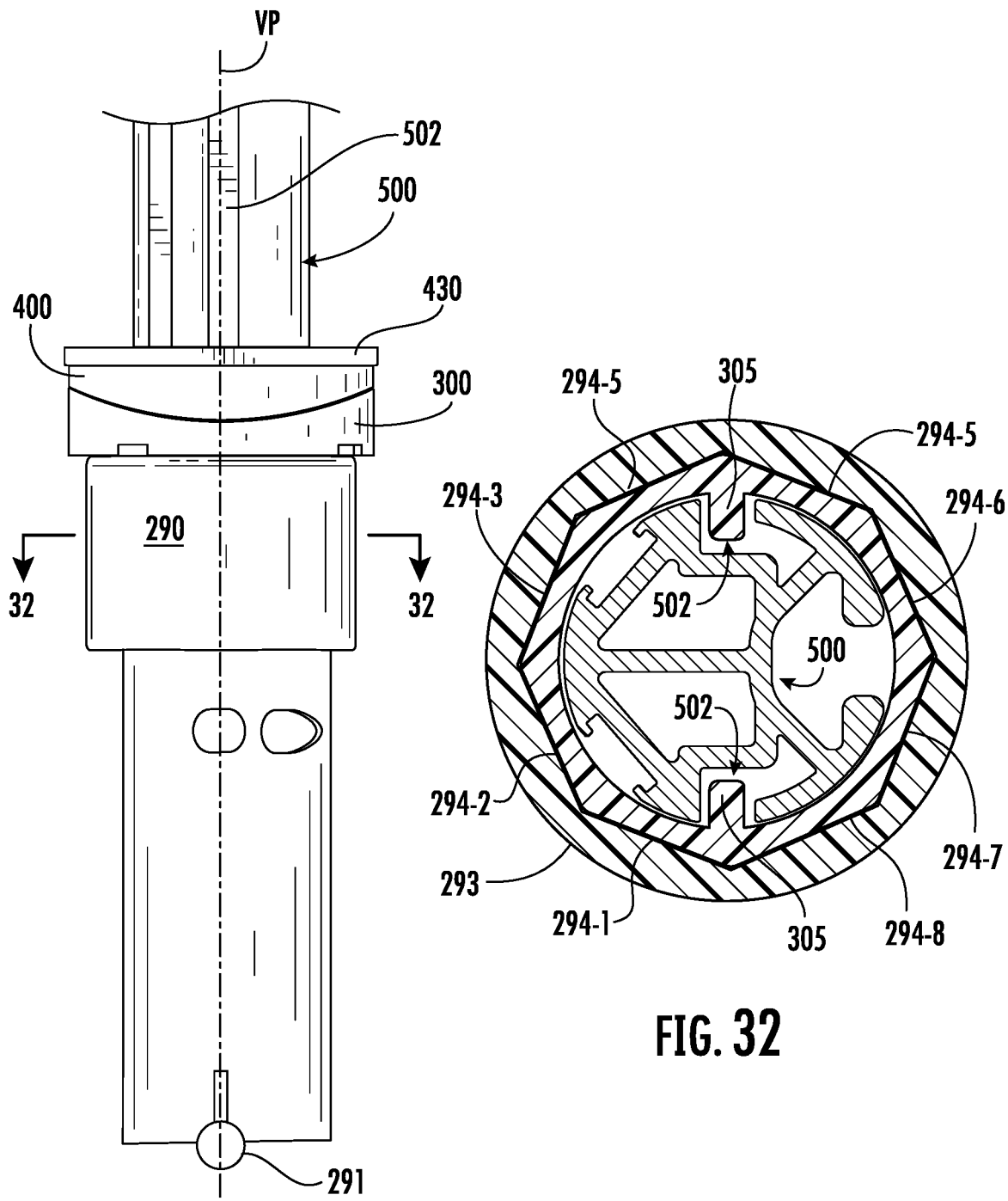
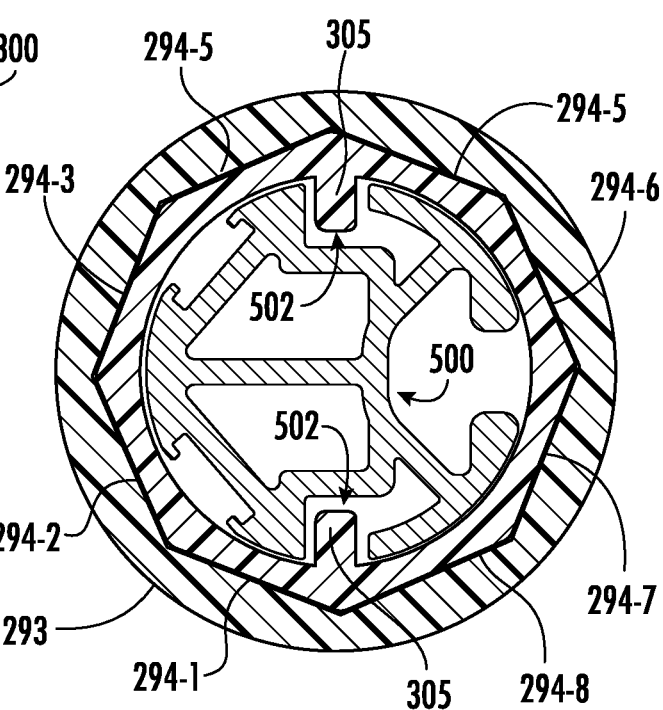
FIG. 31
FIG. 32

— 1 —

SYSTEM FOR SECURING AN ELONGATED MEMBER

CROSS REFERENCE TO RELATED APPLICATION

This application claims priority to application Ser. No. 17/396,365 that was filed on Aug. 6, 2021 and is incorporated herein as if fully set forth herein.

FIELD OF INVENTION

The present invention relation generally to the field of support an elongated member in a vertical position. More particularly, the invention relates to an elongated member or pole that serves as support for another object. Most particularly, the invention relates to an elongated member or pole that serves as support for product display.

BACKGROUND

Product displays have taken many forms over the years and a consistent problem with the displays is the time and effort needed to assembly and place the display. Many display systems have a predefined shape of geometric configuration that makes it difficult to change the display. The difficulties associated with changing the display, particularly those with a fixed configuration, add a significant cost element and may result in a decision to avoid changing a display.

SUMMARY

The present invention addresses the prior art shortcomings by providing a system for supporting a display that is adjustable so it can accommodate displays with different sizes and different display material. In addition, the support system enables pre-assembly of a display module and its orientation on the support before the module is set in the desired location. Still further, the support system can accommodate display with different lengths and widths.

BRIEF DESCRIPTION OF THE DRAWINGS

FIG. 31 is an assembly of the components shown in FIG. 29;

FIG. 32 is a section through the line 33-33 in FIG. 31;

DETAILED DESCRIPTIONS

Figure 1:
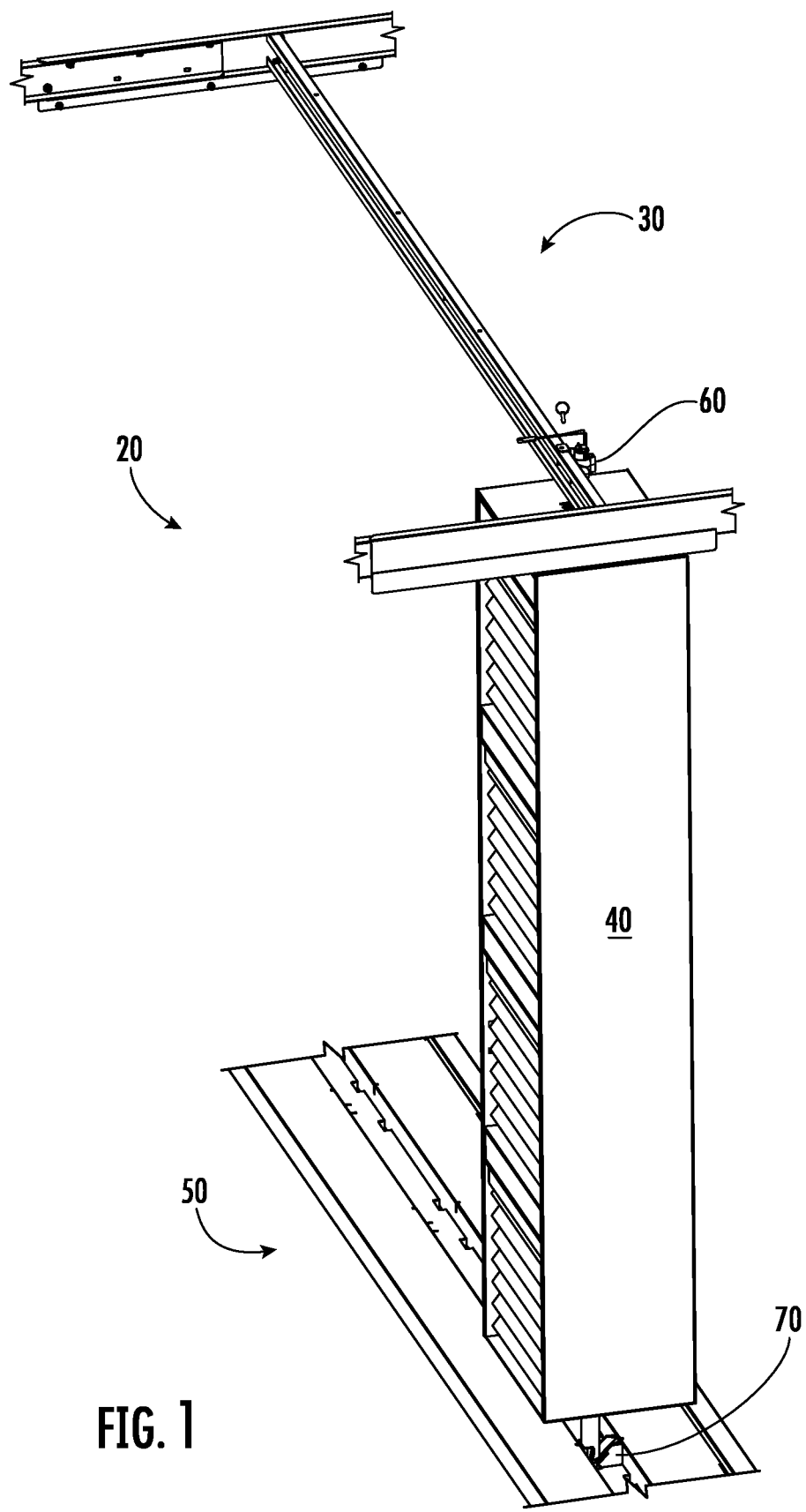
FIG. 1 illustrates a display that is secured in place with a first embodiment of the support system.

FIG. 1 illustrates a display assembly 20 where the display 40 is secured to an upper support 30 and a lower support 50 with a collar 60 and base 70 according to the invention.

Figure 2:
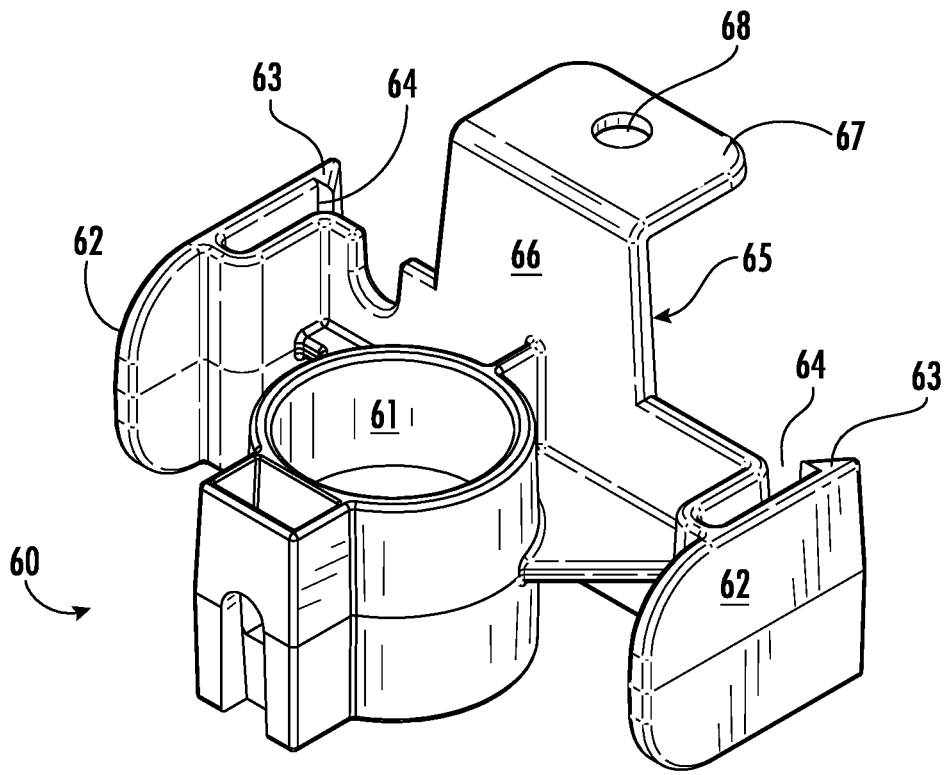
FIG. 2 is a front perspective view of a first collar for the support system.
Figure 3:
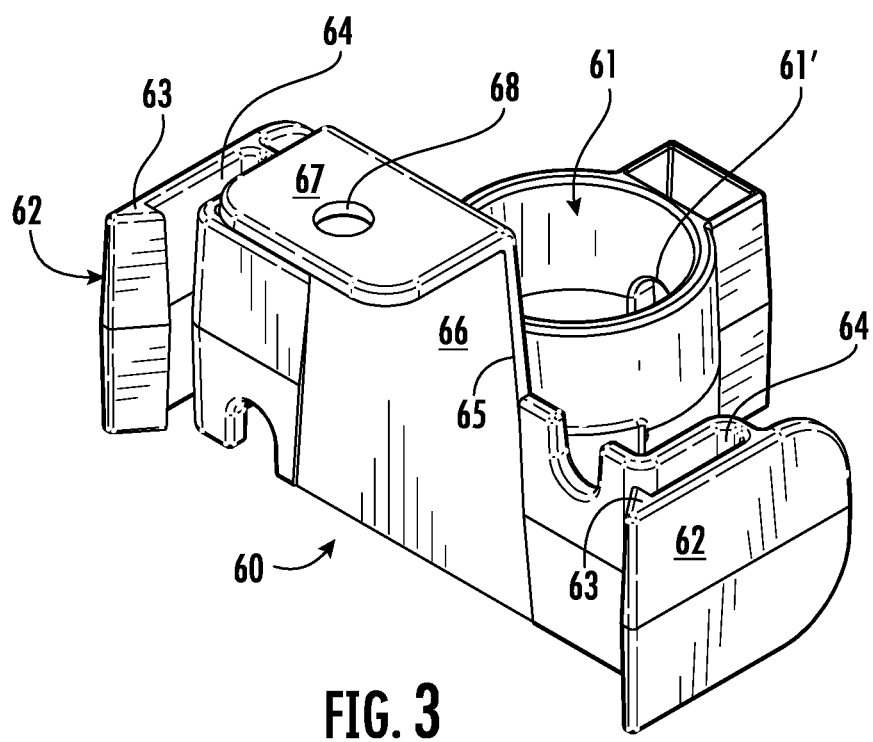
FIG. 3 is rear perspective of the collar member in FIG. 2.
Figure 10:
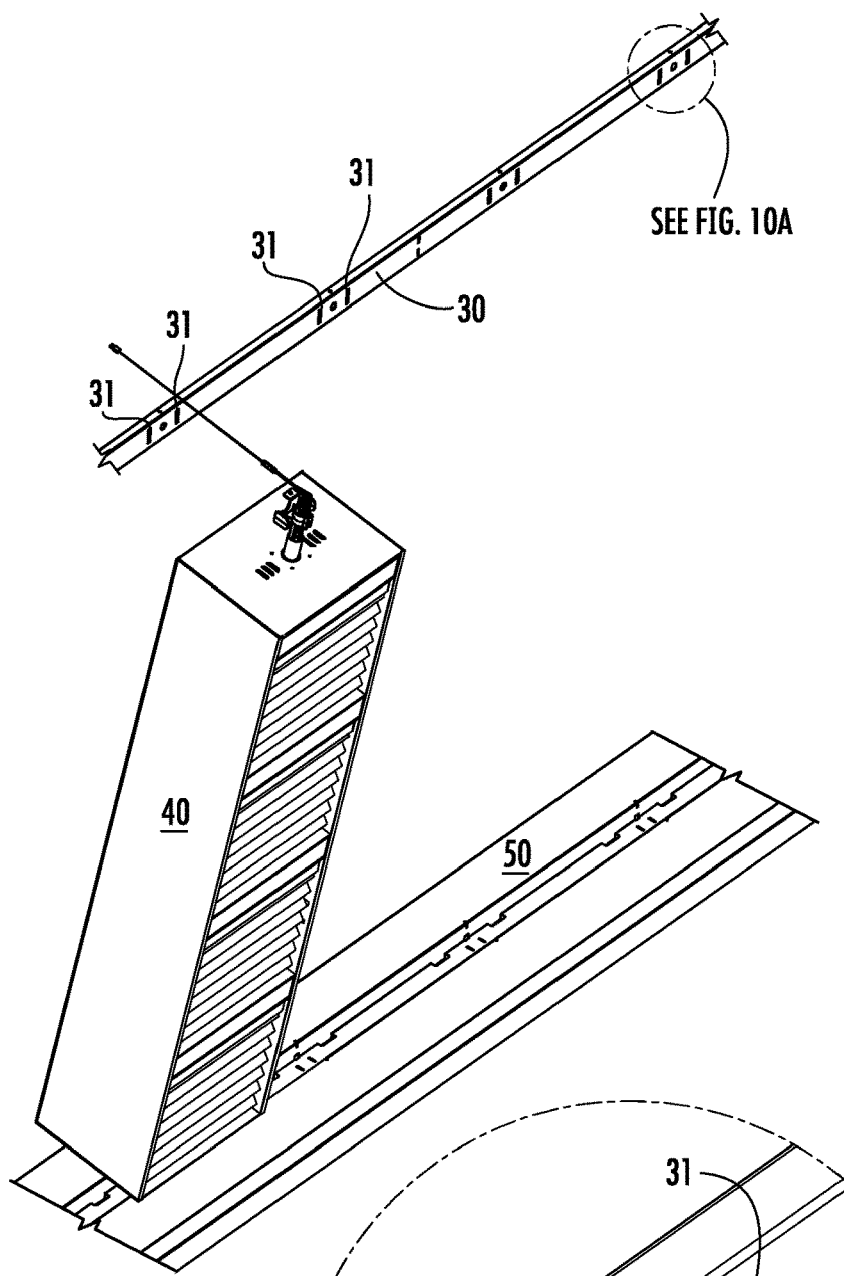
FIG. 10 illustrated how a display mounted on an elongated member with a collar according to FIG. 4 is secured an upper support structure.
Figure 10A:
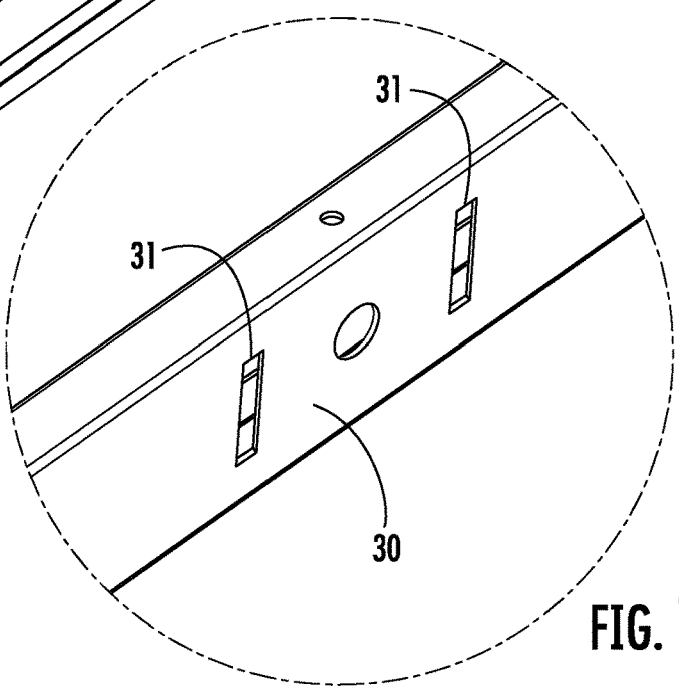
FIG. 10A is an enlarged view of the encircled area in FIG. 10.
Figure 11:
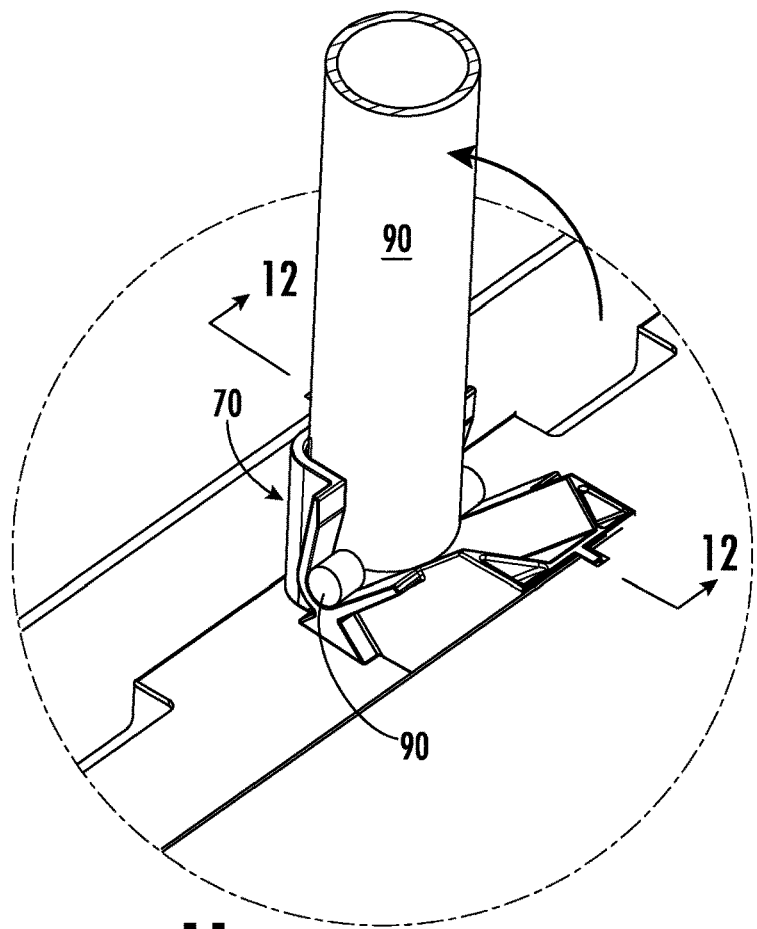
FIG. 11 illustrates the final position of the elongated member in a base according to FIG. 4.
Figure 12:
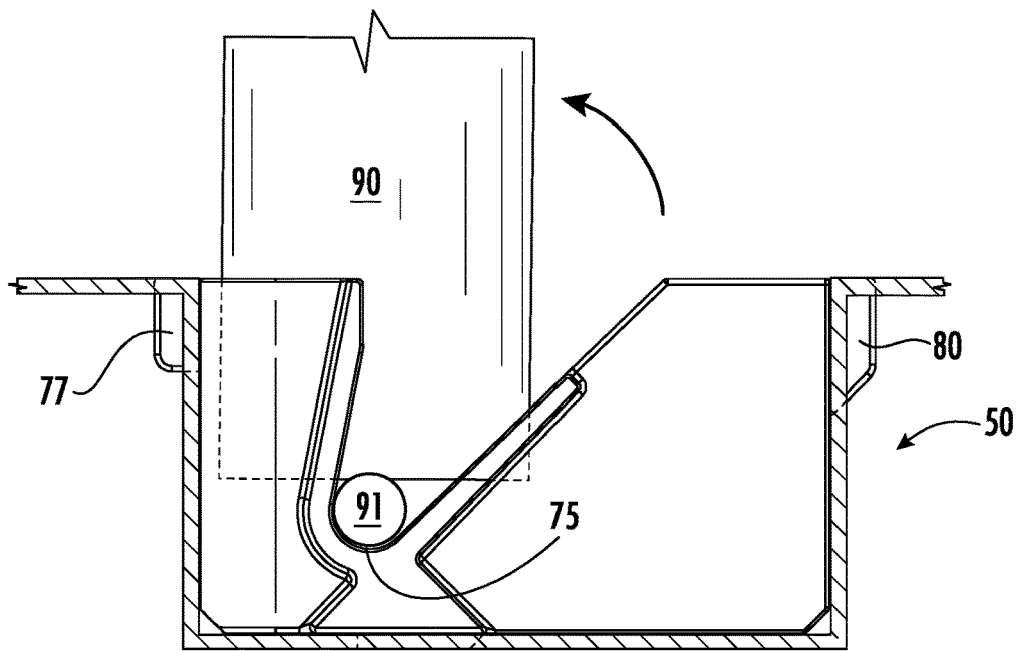
FIG. 12 is a section along the line 12-12 in FIG. 11.
Figure 13:
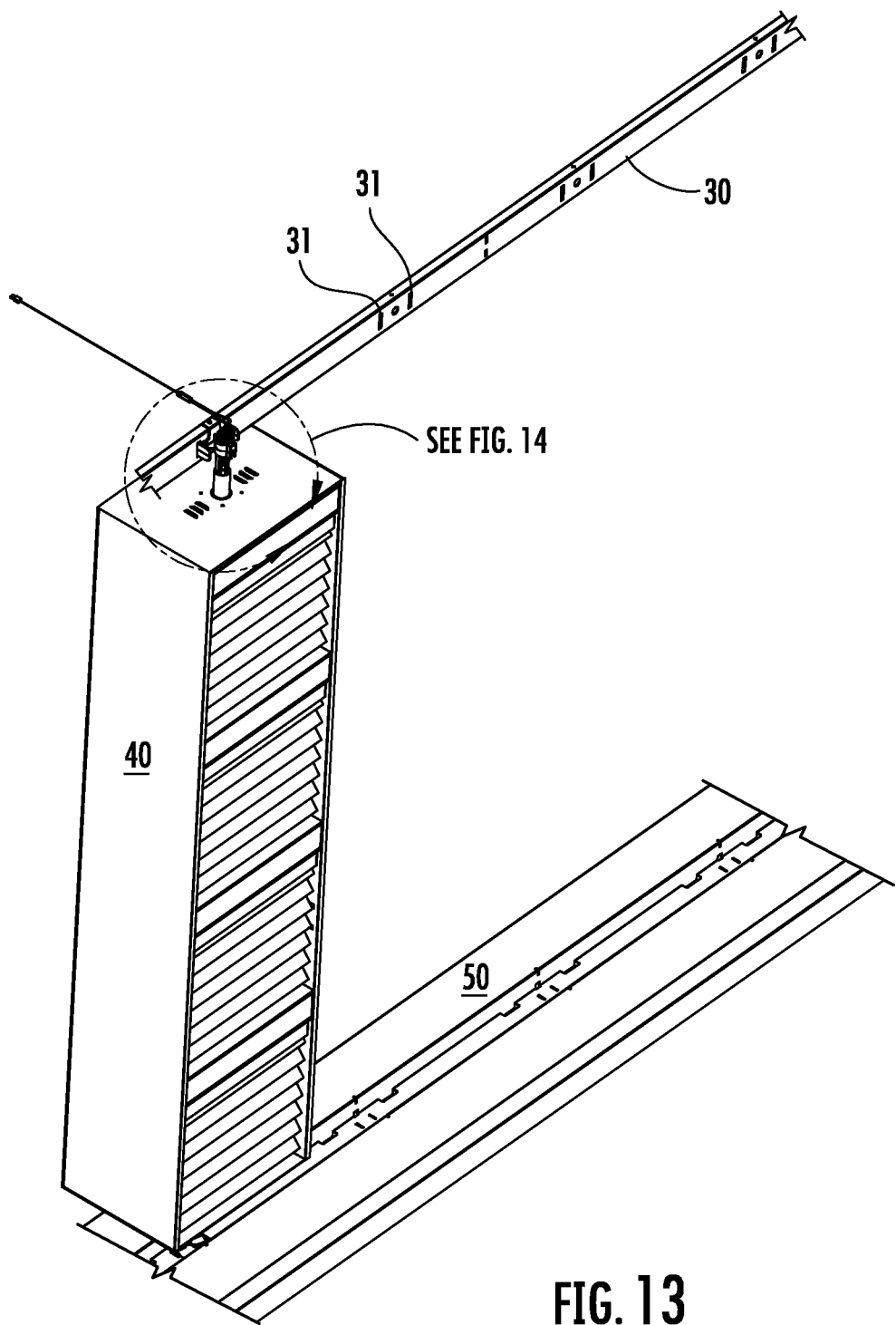
FIG. 13 illustrated the display in a final position.
Figure 14:
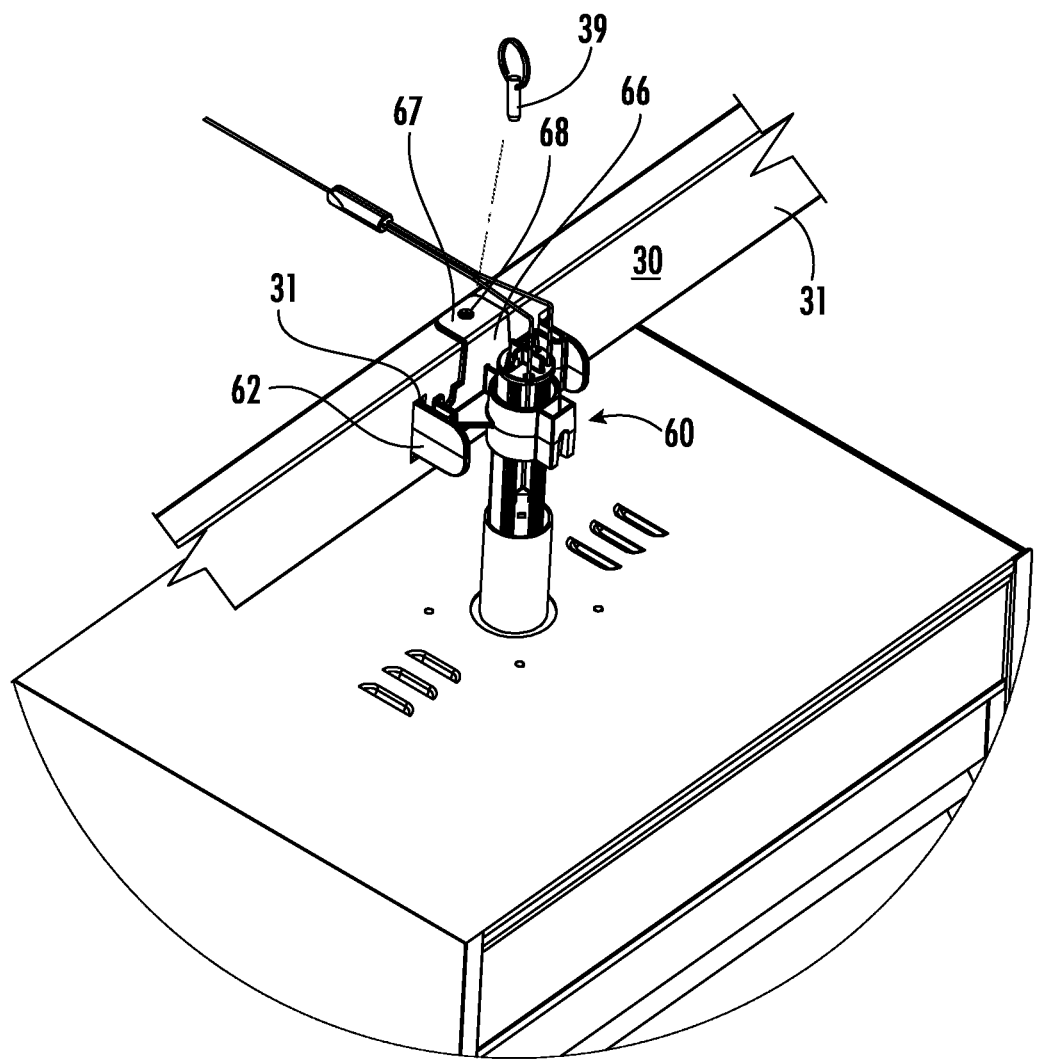
FIG. 14 illustrates the application of a pin to further secure the collar and the position of an optional electric supply to the elongated member.
Figure 15:
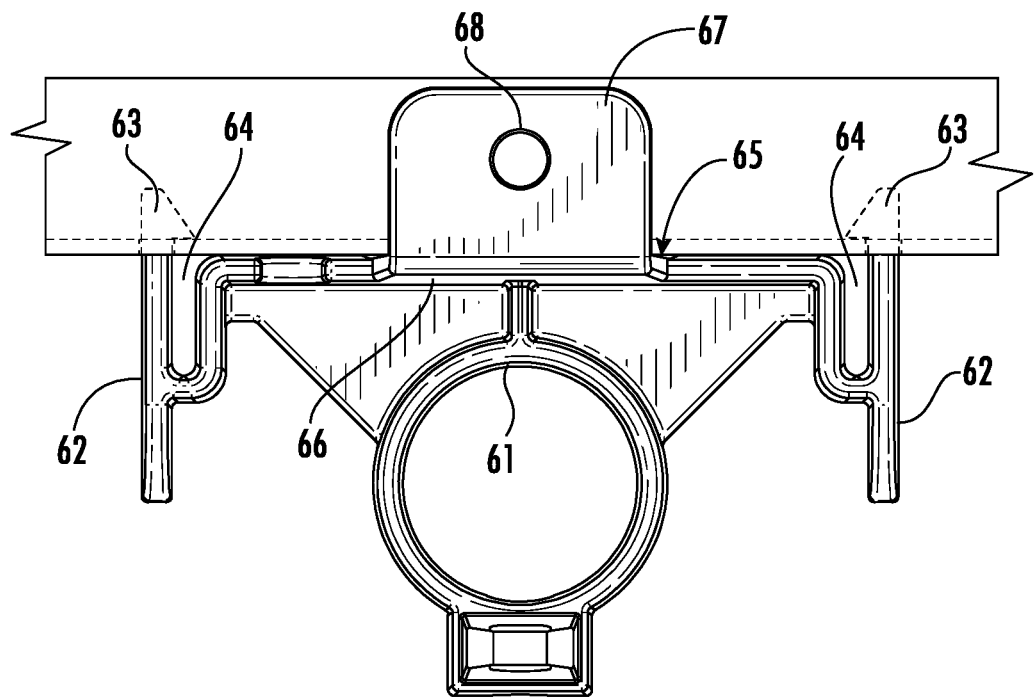
FIG. 15 is a top plan view of the base according to FIG. 4.
Figure 16:
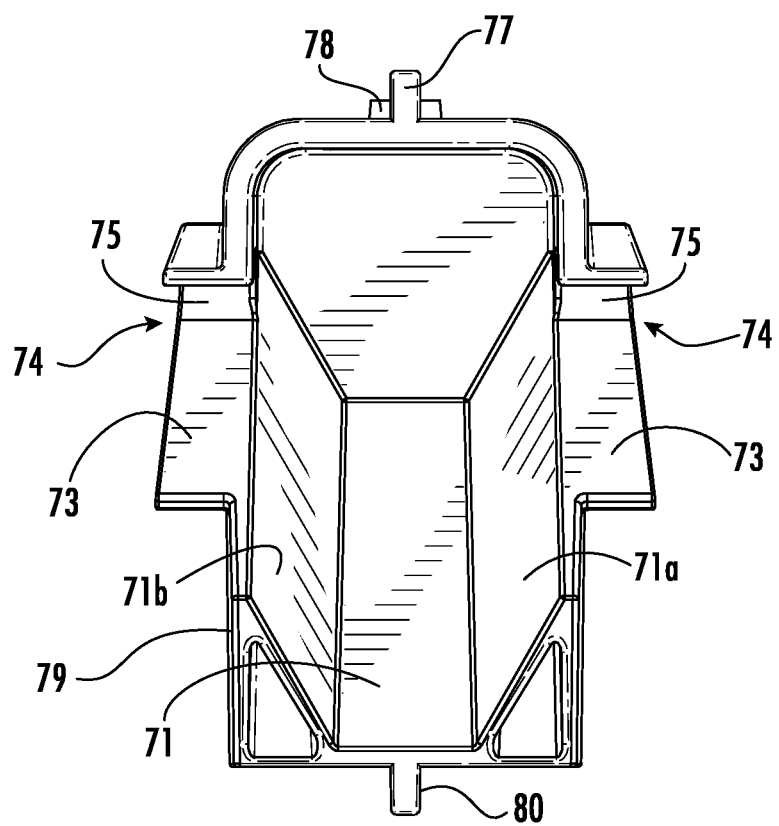
FIG. 16 is a top plan view of the collar according to FIG. 4.

With reference to FIGS. 2 and 3, the collar 60 will be described in more detail. The collar 60 has an enclosure 61 that is configured to receive and hold a portion of an elongated member that is associated with a display 40 to an upper support 30. In the currently preferred embodiment, the enclosure 61 is circular and has an aperture 61' for passing a locking fastener into the enclosure. The locking fastener will hold a circular elongated member in place and prevent rotation if the display is rotated. If the elongated member in non-circular and the enclosure 61 has a complement shape, the use of a fastener can be eliminated. The collar 60 has two side wings 62. Each wing 62 is flexible and has a locking tab 63 that passes through a slot 31 and springs behind the upper support 30, see FIGS. 10 and 14, to secure an elongated member to the upper support 30. 60 includes a gap 64 that is provided between the brace 65 and the respective wing 62. The brace 65 includes a vertical wall 66 and a horizontal projection 67. The horizontal projection 67 has an opening 68 through which a locking pin 39 passes and into the opening 33 in upper support 30.

Figure 4:
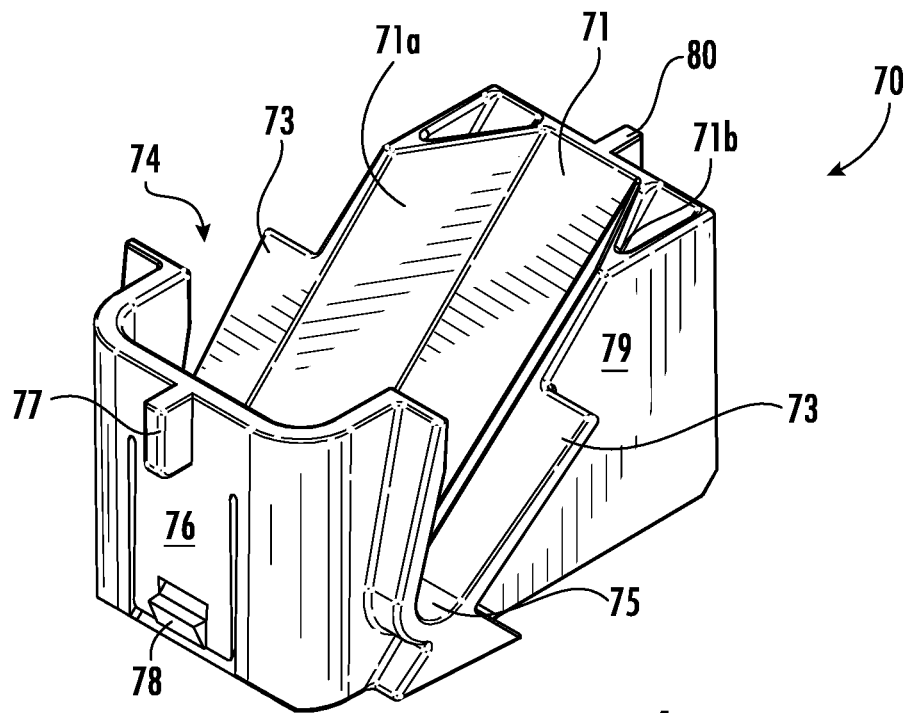
FIG. 4 is a front perspective view of a first embodiment of a base for the support system.
Figure 5:
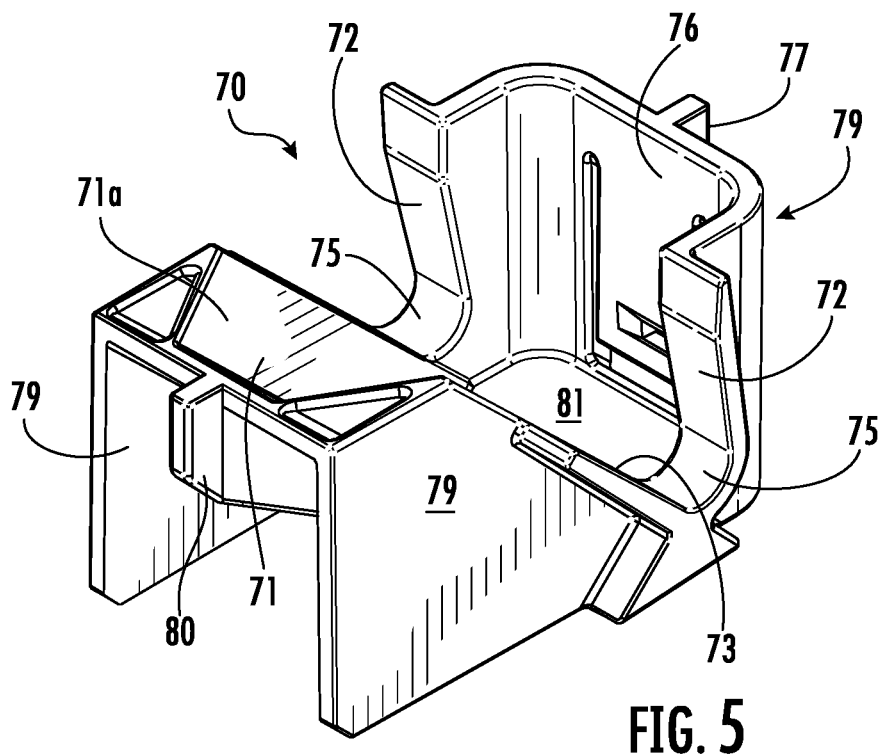
FIG. 5 is rear perspective of the base in FIG. 4.
Figure 6:
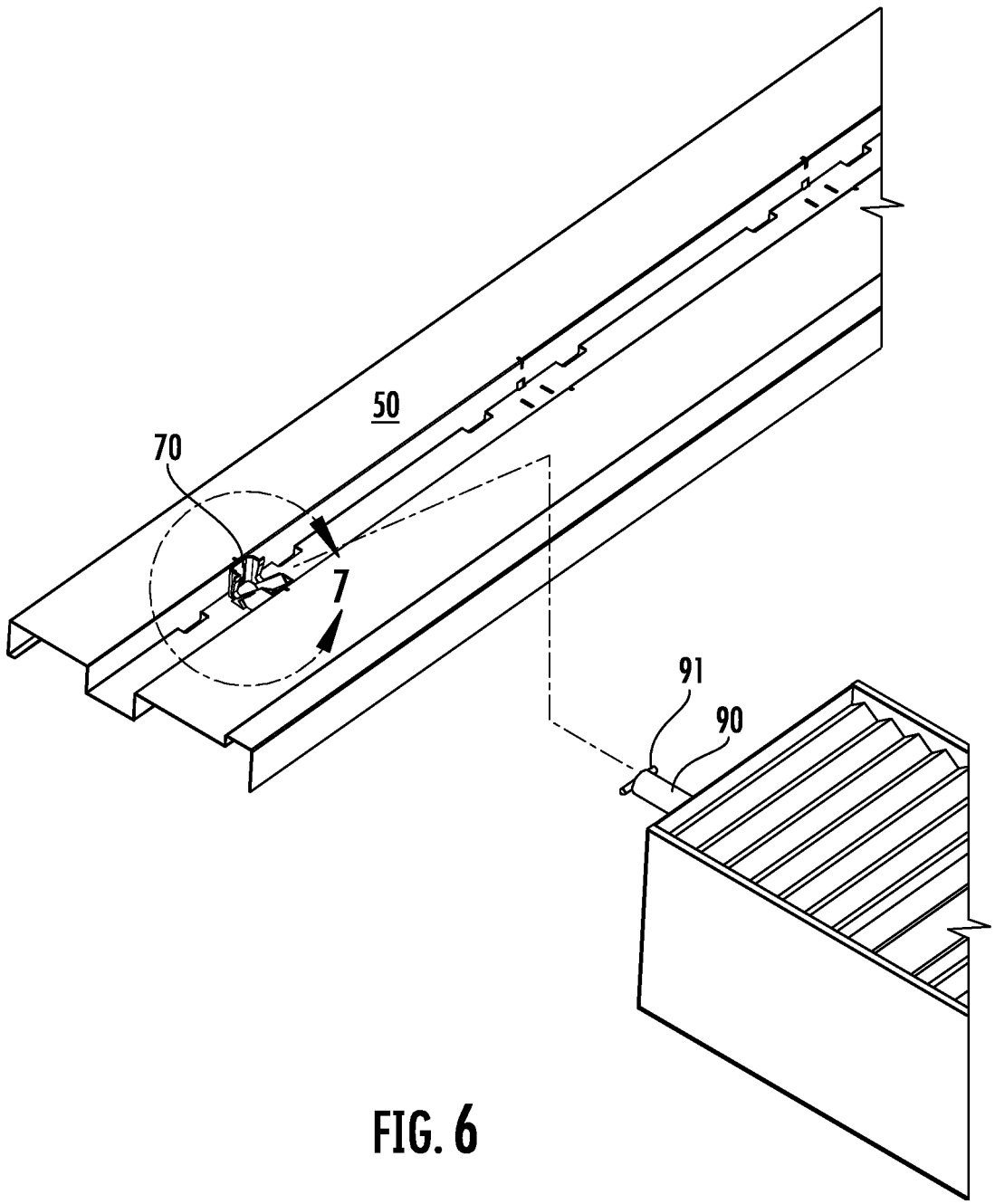
FIG. 6 illustrated how a display mounted on an elongated member is secured in a base in FIG. 4.
Figure 7:
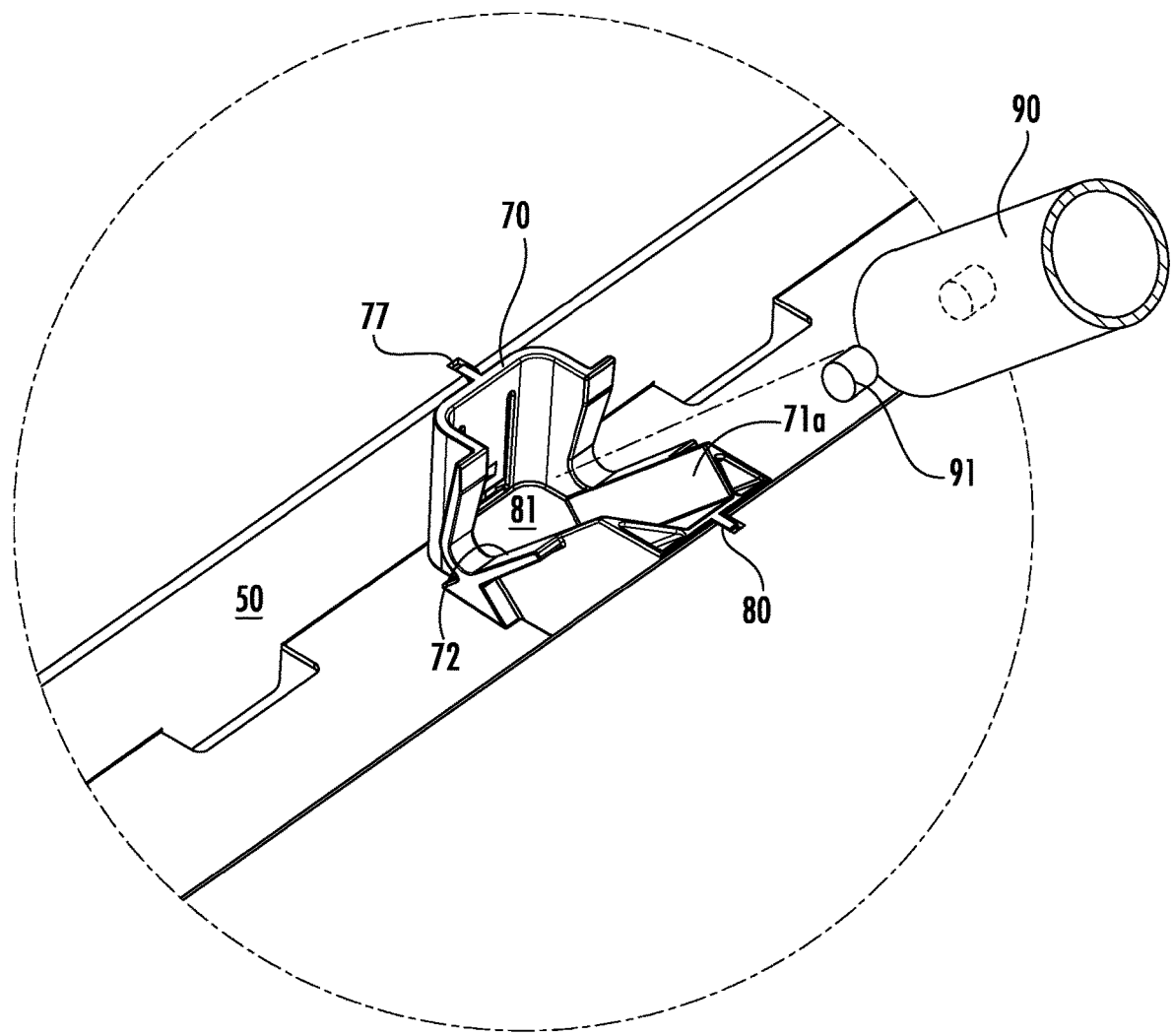
FIG. 7 is an exploded view illustrating the assembly of a tubular elongated member as it is addressed to a base.
Figure 8:
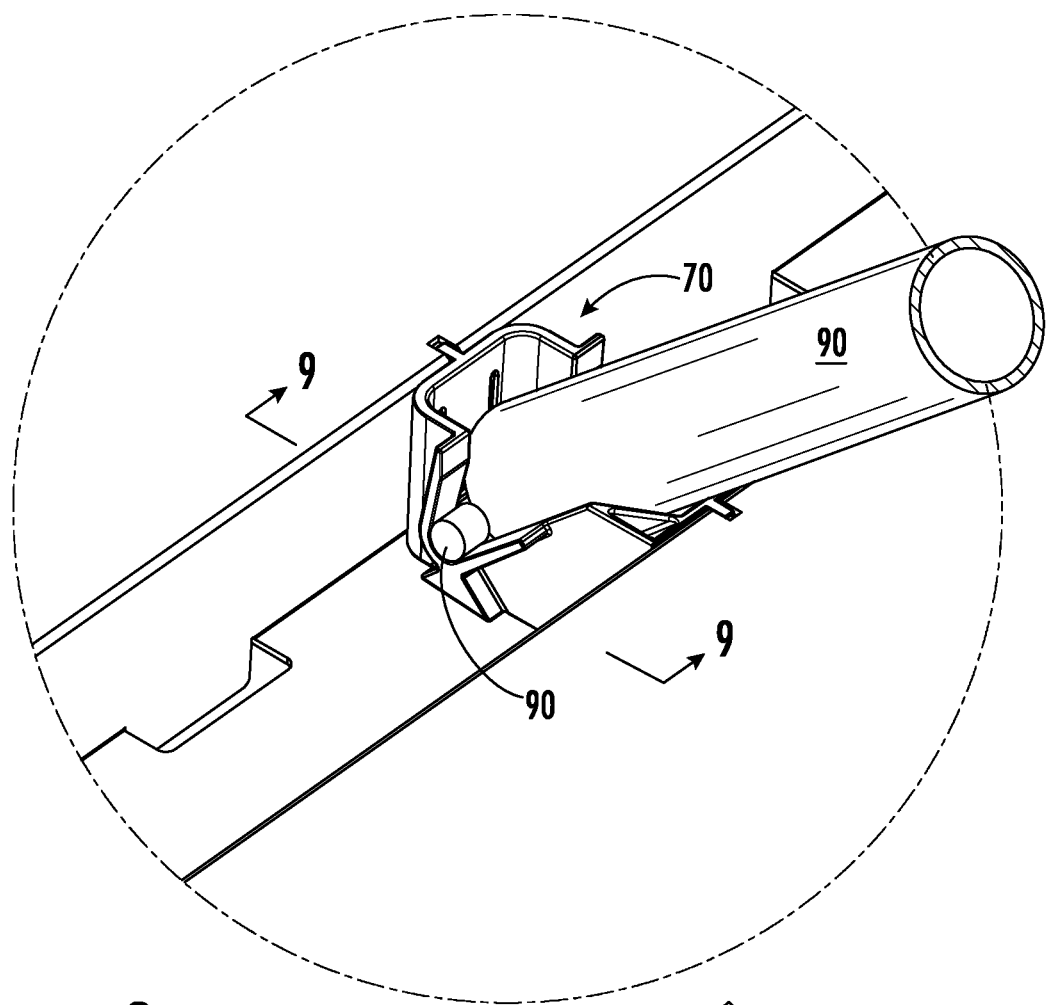
FIG. 8 illustrates the initial position of the elongated member in the base.
Figure 9:
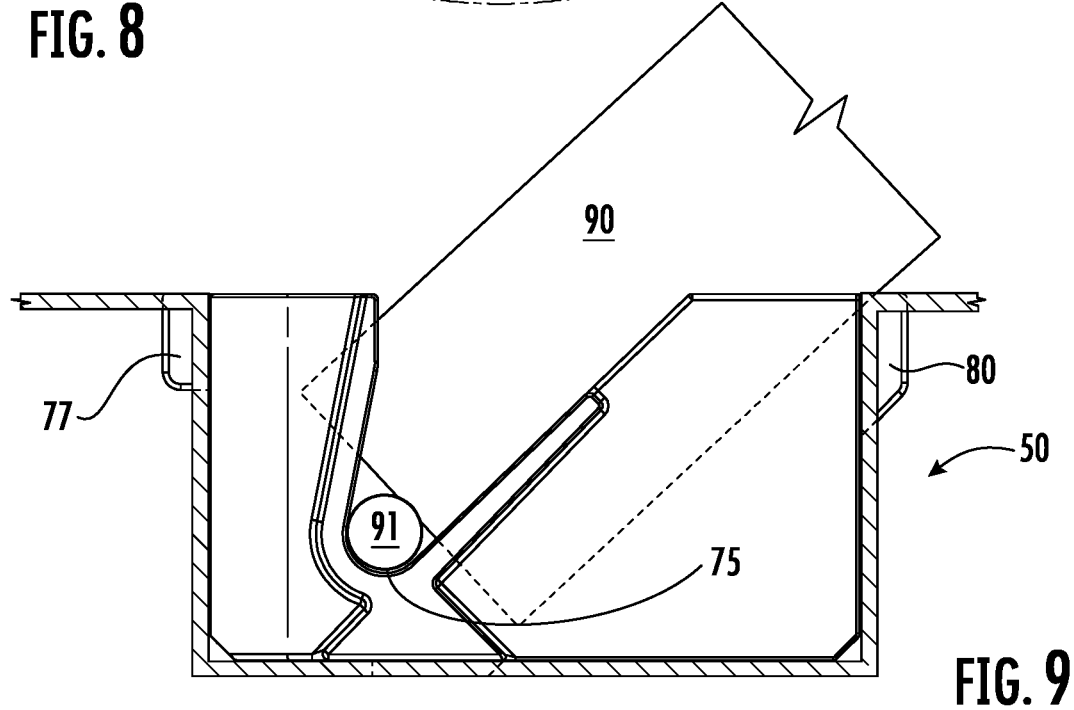
FIG. 9 is a section along the line 9-9 in FIG. 8.

With reference to FIGS. 4 and 5, the base 70 will be described in more detail. The base 70 has a ramp or inclined surface 71 that extends inwardly from an upper horizontal edge between the side walls 79 to a pivot position 75 that is between the guides 72 and 73. The guides are positioned beside the ramp 71 to complement the ramp 71 in guiding the elongated member into the recess 76 and the pivot location 75, see FIGS. 8 and 9. The base 70 has projections 77 and 80 that align with slots in the lower support 50 for positing the base 70 along the lower support 50 and a locking projection 78 that extends from the outside of the wall defining the recess 76 passes into a slot in a wall of the lower support 50.

With reference to FIGS. 6 through 12, it can be seen how the base 70 enables an elongated member, preferable with an attached display 40, to be installed and removed through alignment with the base and rotation between the angled ramp 71 and the upright position in recess 76. In a preferred embodiment, the elongated member 90 is tubular and dimensioned to fit with the space defined by the ramp 71 and the wings 71a and 71b, and be received with recess 76. The pin 91 is fixed to the bottom of the elongated member 90 and is dimensioned to cooperate with guides 73 and fit within the pivot position 75. The pivot position 75 is spaced from the floor 81 so there is sufficient room for the elongated member to be rotated from the ramp 71 to the set position in recess 76, see FIGS. 9, and 12 through 14. When the elongated member is in the desired position, the locking tabs 63 of the collar 60 are secured in the slots 31 in upper support 30 and a pin 39 is inserted in the opening 68 to prevent the tabs 63 from being accidently dislodged from slots 31. If it is desired to remove or modify the display on the elongated member 90, the pin 39 is removed, the locking tabs 63 are released from the slots 31 in upper support 30 and the elongated member can be rotated down control to the ramp 71.

In the preferred embodiment, upper support 30 is a rail of any desired length with one or more positions having a set of slots 31 for connecting with the locking tabs 63. The lower support 50 is generally sized in equal length with the upper support 30. However, the loser support 50 many have a greater depth according to the display's depth or, when desired, to provide a location for related information, such as product size, color, price, of the like.

With the alternative embodiments of collar 60 and base 70 in FIGS. 17 through 22, it is possible to eliminate the upper support 30, the lower support 50 or both from the display. With reference to FIGS. 17 through 22, the alternative embodiments will be described with like elements having the same element numbers as the same element in the preferred embodiments.

Figure 17:
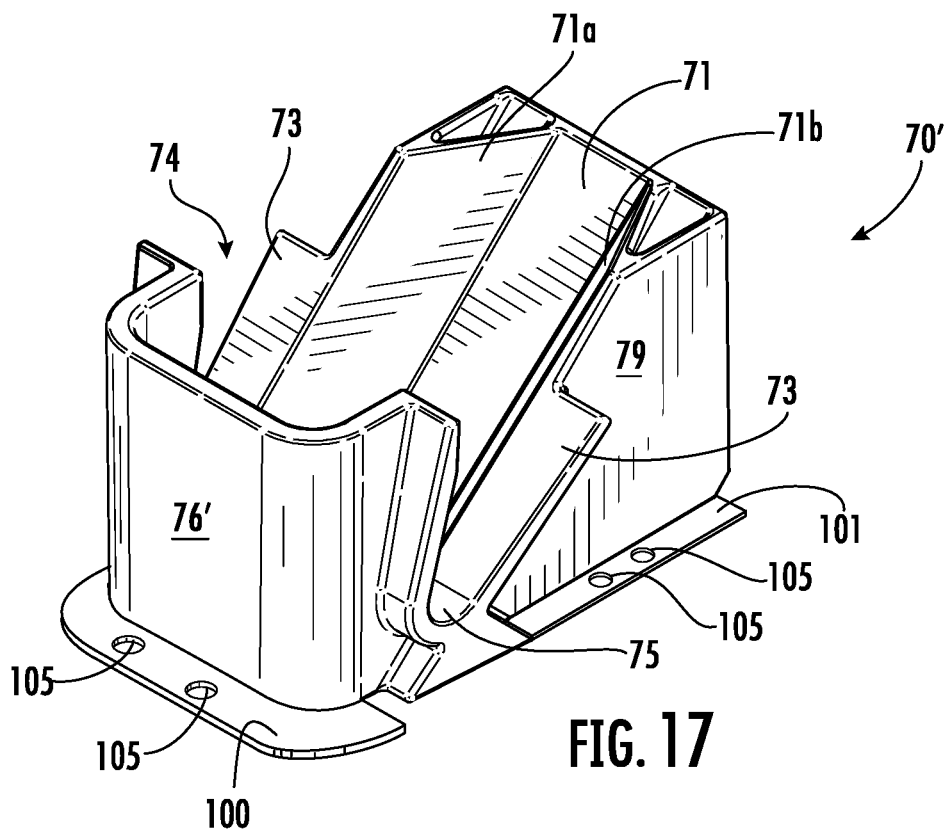
FIGS. 17 and 18 are respective front and rear perspectives of a first alternative base.
Figure 18:
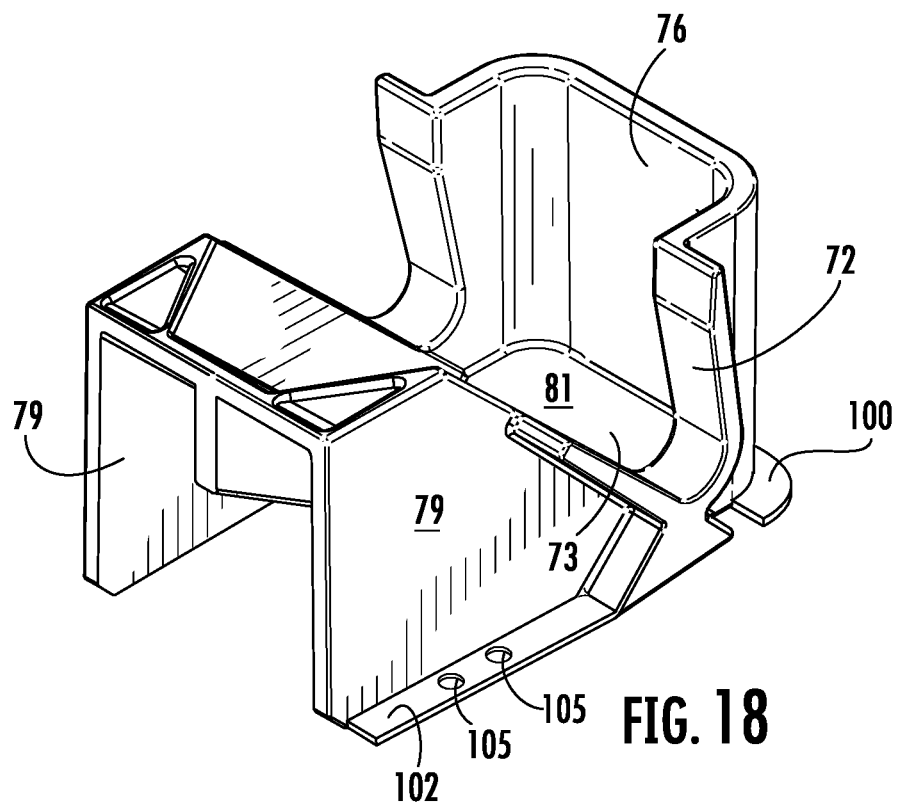

The alternative base 70' shown in FIGS. 17 and 18 does not have projections 77, 78, and 80, found in the preferred embodiment. In this alternative embodiment, base 70' is provided with lower appendages 100, 101, and 102 that have fasteners apertures 105 through which a fastener can be passed to an existing support structure, such as an existing floor in a display area.

Figure 19:
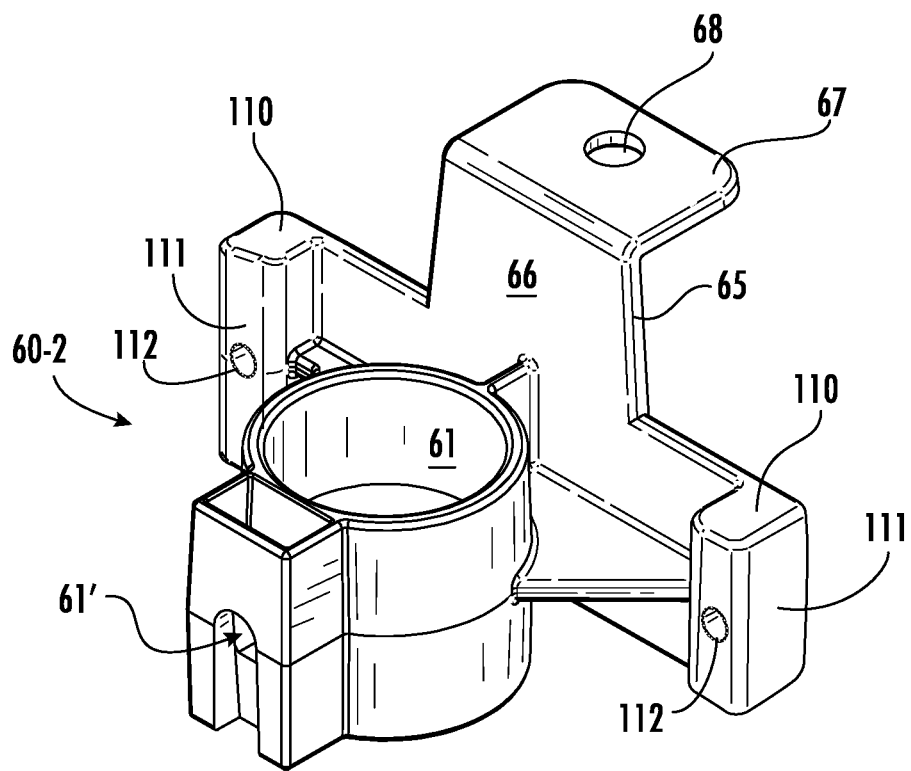
FIGS. 19 and 20 are respective front and rear perspectives of a first alternative collar.
Figure 20:
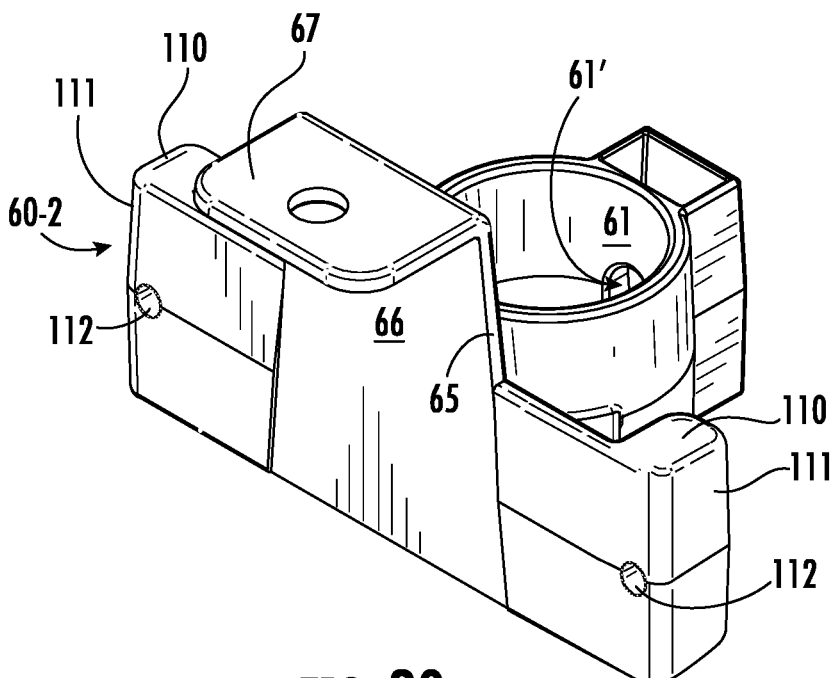
Figure 21:
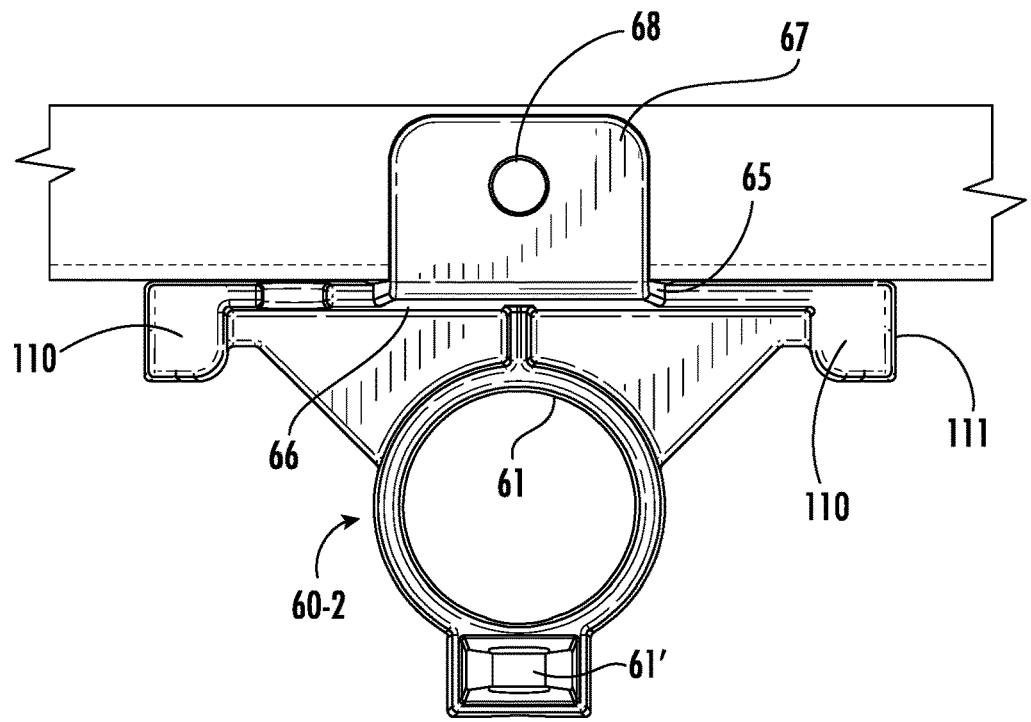
FIG. 21 is a top plan view of the alternative collar in FIGS. 19 and 20.
Figure 22:
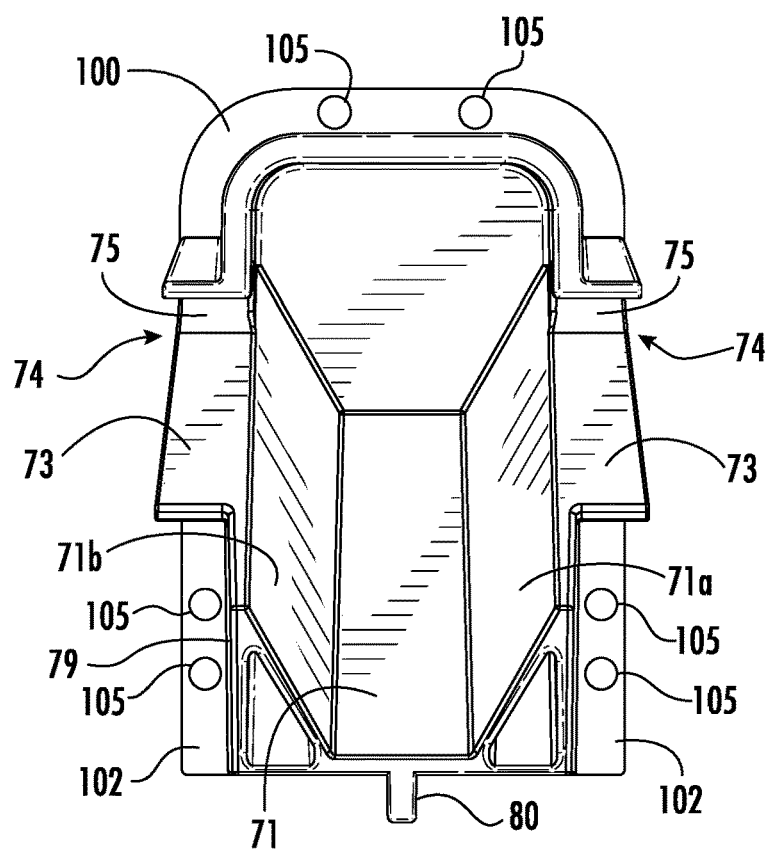
FIG. 22 is a top plan view of the alternative base in FIGS. 17 and 18
Figure 23:
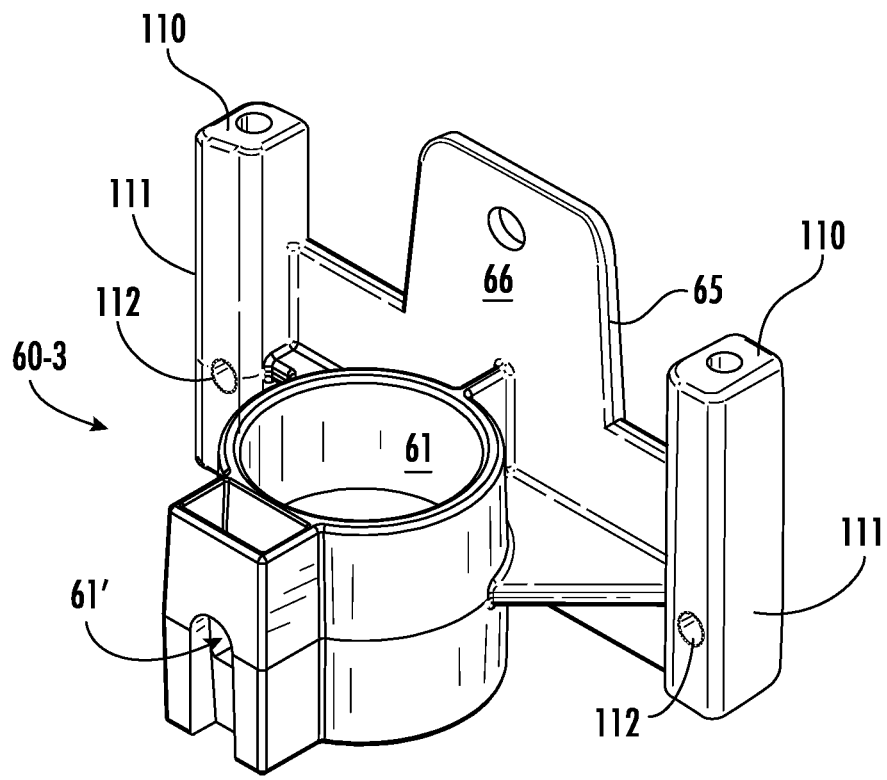
FIG. 23 is a perspective view of a second alternative collar according to the invention.
Figure 24:
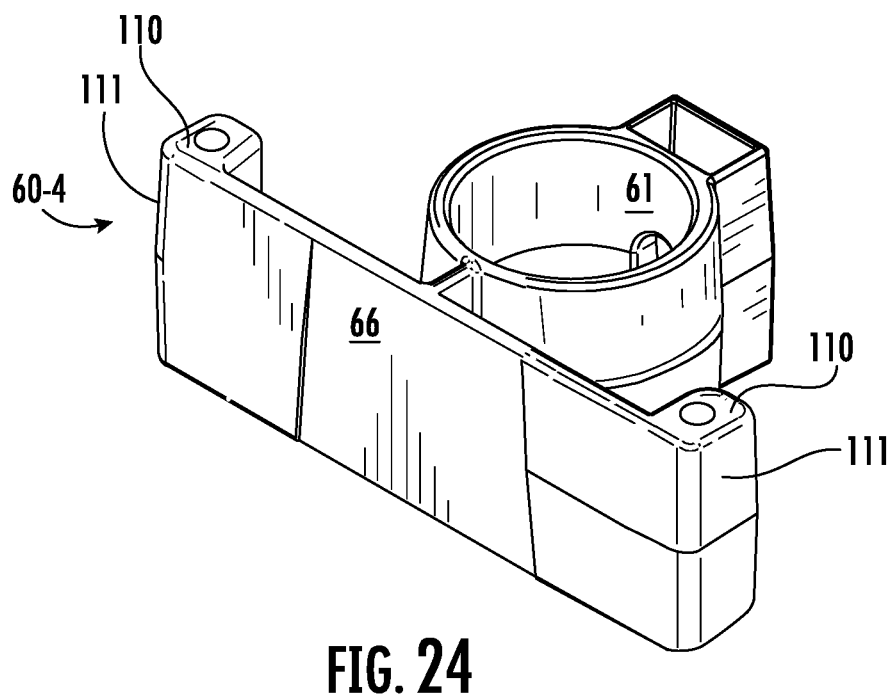
FIG. 24 is a perspective view of a third alternative collar according to the invention.

The alternative collar 60-2 shown in FIGS. 19 and 20 does not have wings 62, locking tabs 63 or gaps 64 that are found in the preferred embodiment. In this alternative embodiment of collar 60-2, the projections 110 have a thickness 11 that is selected to provide sufficient strength for passing a fastener through the apertures 112 to secure the collar to beam or an existing structure, such as a partition.

The second and third alternative embodiments, 60-3 and 60-4, of the collar do not have the horizontal projection 76 and provide for a flat attachment where necessary.

A support system that enables adjusting the orientation of the display by adjusting the position of the support member will be described with reference now to FIGS. 25 to 30.

Figure 25:
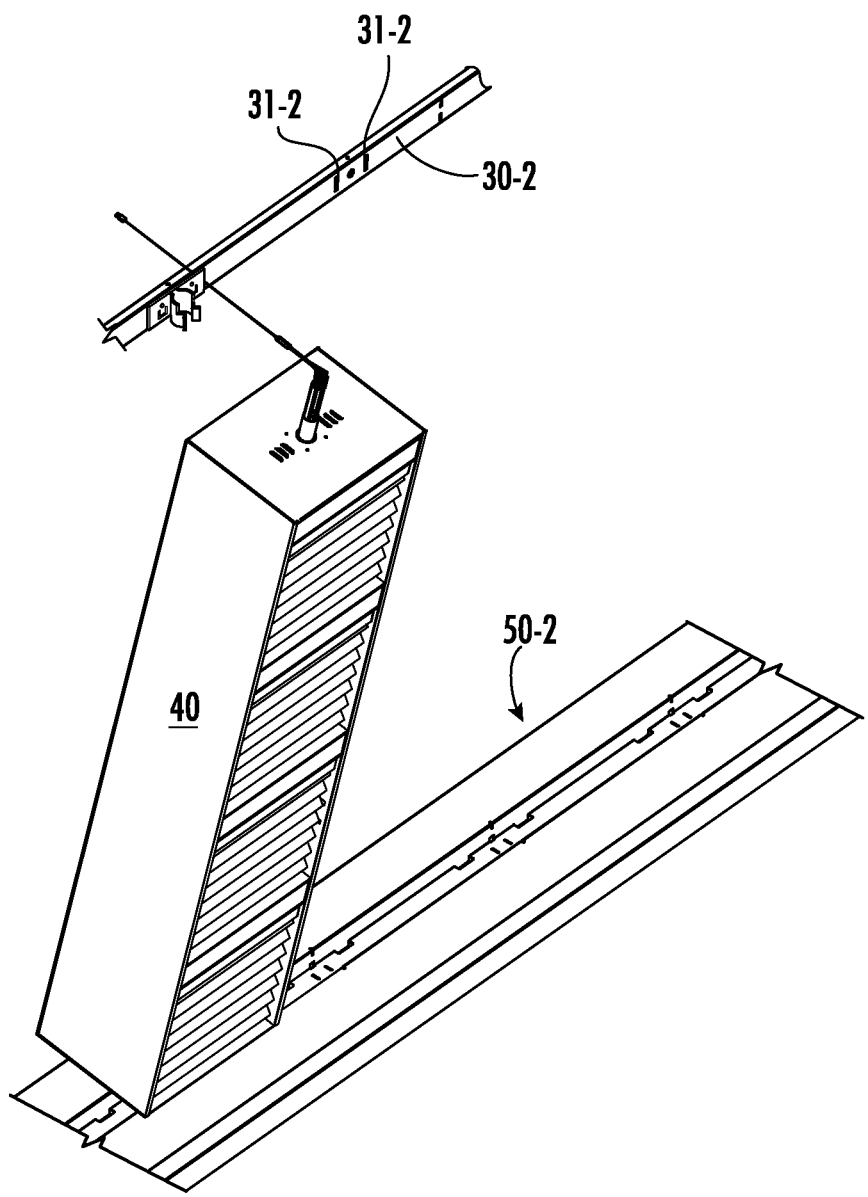
FIG. 25 illustrates a display that is secured in place with an alternative embodiment of the support system.
Figure 26:
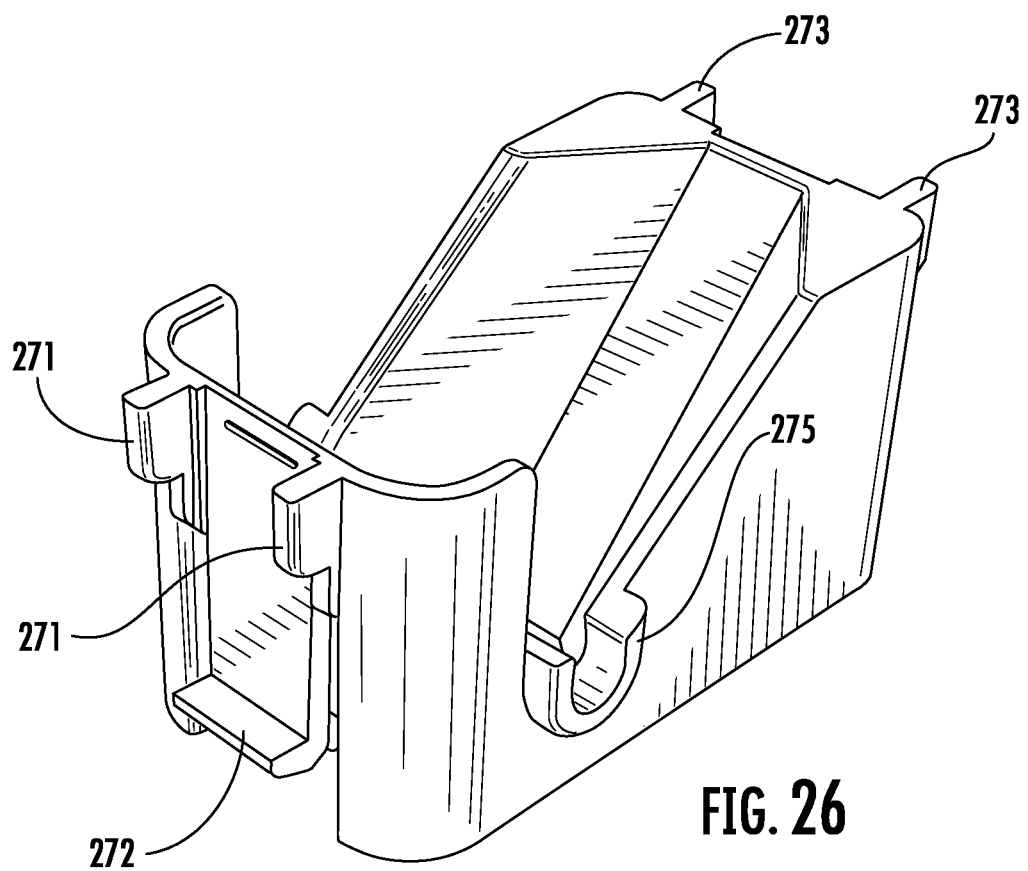
FIG. 26 is a front perspective of an alternative base for the system in FIG. 25.
Figure 27:
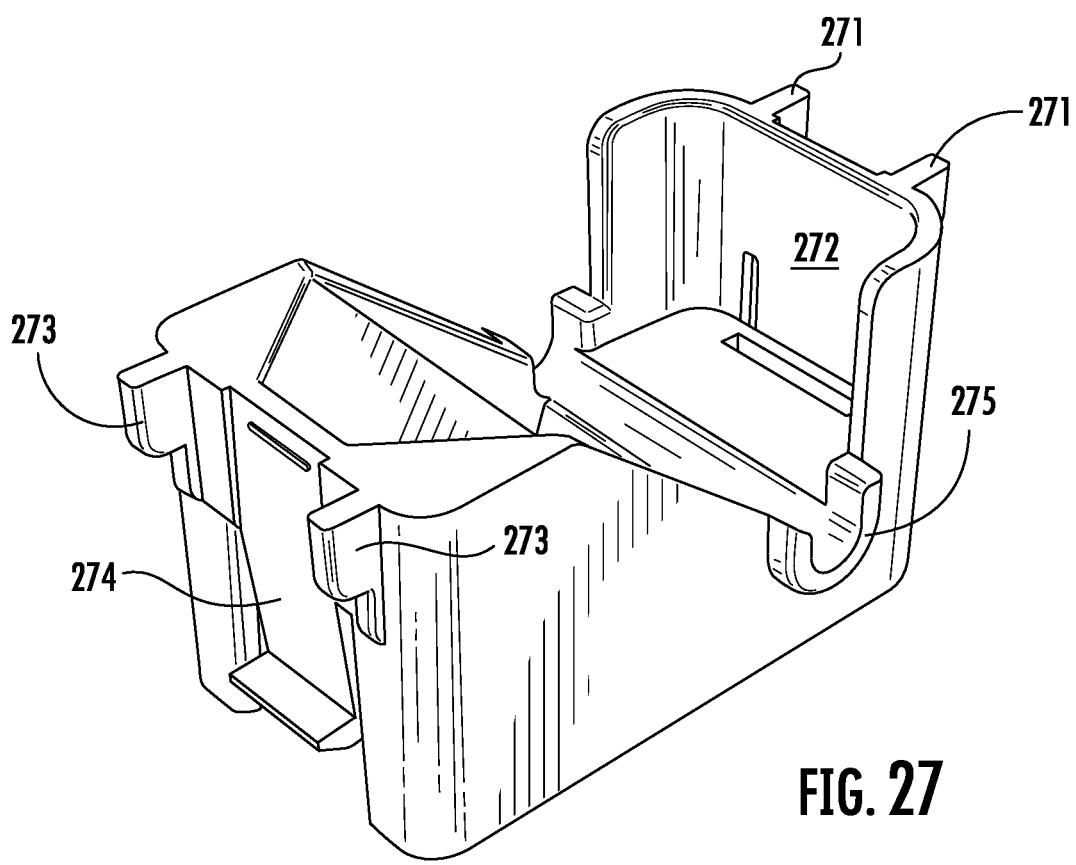
FIG. 27 is a rear perspective of the base in FIG. 26.
Figure 28:
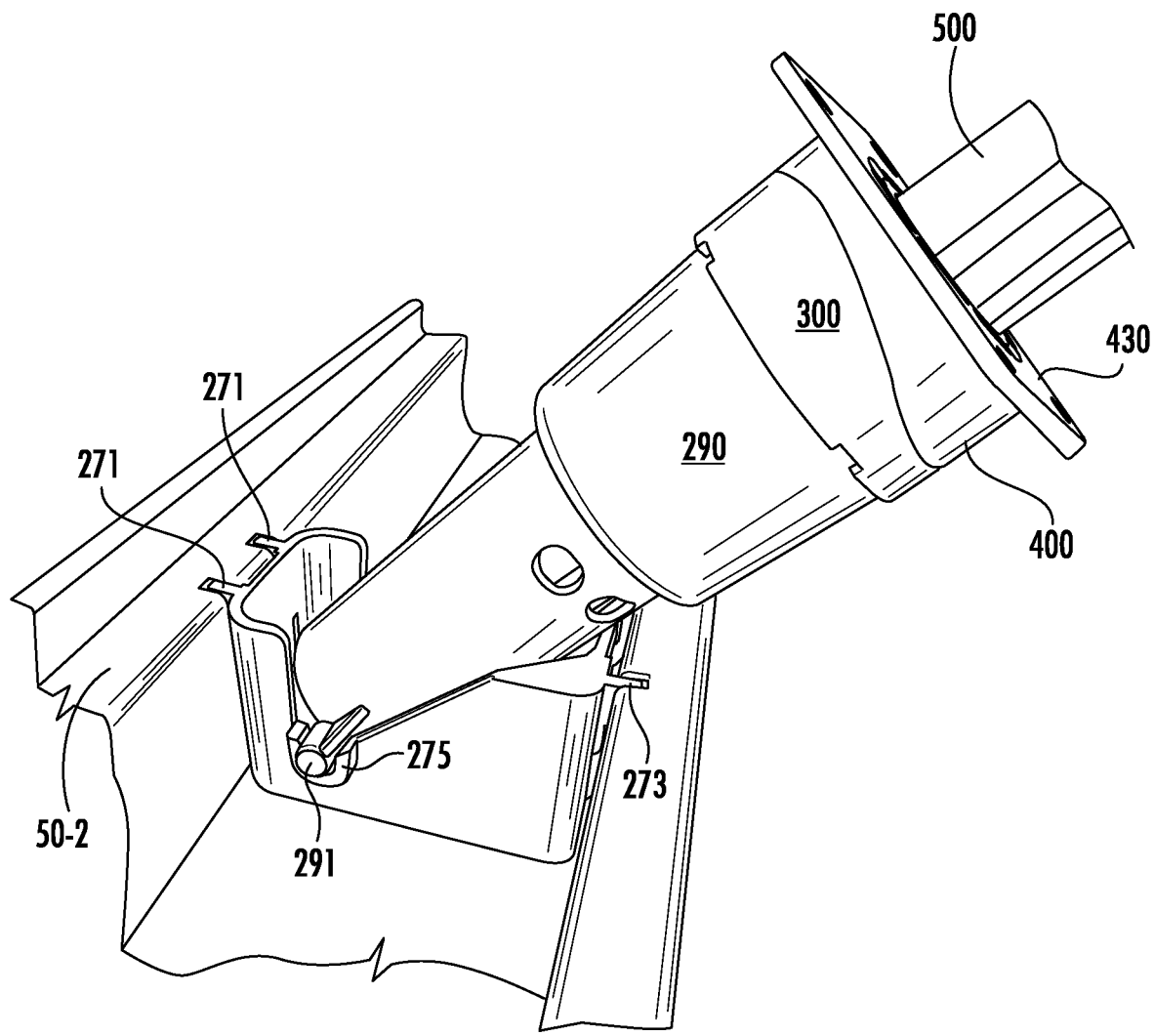
FIG. 28 illustrates the initial position for installing the alternative embodiment of the support system in FIG. 25.

The display structural members 30-2 and 50-2, and the base 270 in FIGS. 25 and 27 are functionally similar to the structural members 30 and 50, and the base 70 in FIGS. 4 and 5. The base 270 differs in that it has four projects, 271 and 273, that fit with in slots in structural member 50-2, two biased retainers that fit into additional slots in the structural member 50-2, and a generally "U" shaped pivot 275 that receives the pivot pin 291, see FIG. 30.

Figure 29:
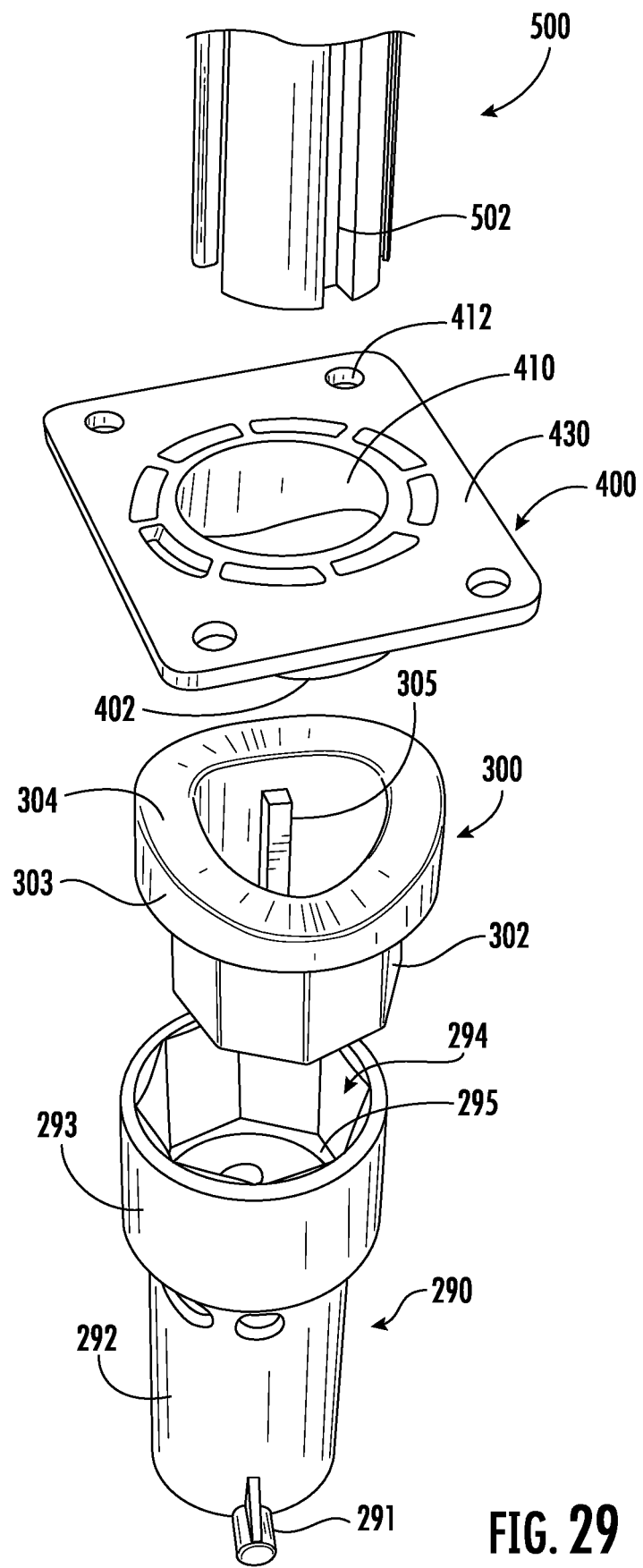
FIG. 29 is an exploded view of the components of the alternative embodiment of the support system.
Figure 30:
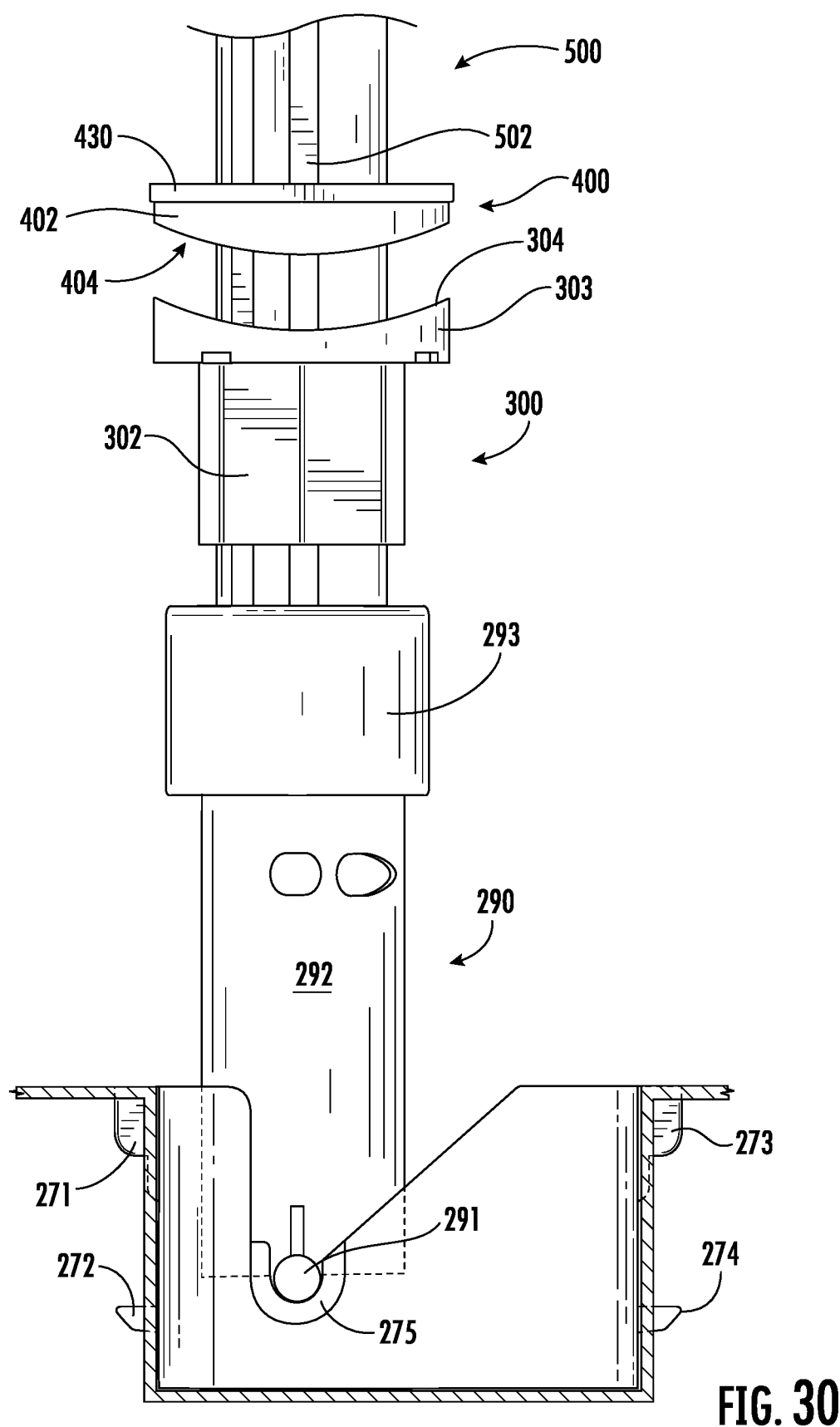
FIG. 30 is an exploded view illustrating the installed position for the alternative embodiment of the support system in FIG. 25.

With reference to FIGS. 29 and 30, the lower support or base 290 has a sleeve or tubular portion 292 and a collar 293 that form an open receptacle for a support 500 that will secure a display. The of the collar 293 has a non-circular interior shape 294; in the illustrated example, it is an octagon. A lip or shoulder 295 is formed at the base of the non-circular shape in the interior 294. The insert or inner sleeve 300 has a non-circular interior 302 that mates with the non-circular interior shape 294. Once inserted the insert 302 and base 290 will move together. The insert 300 has an interior projection 305 that is dimensioned to fit within a slot in the support 500, which will be explained later. The insert 302 has a non-planar surface that undulates to form a camming surface 304 that will be a seat or resting place for a display support 400.

Still with reference to FIGS. 29 and 30, the display support or mount 400 has a planar surface 430 that includes a central opening 410 that is dimensioned so that the support 500 can pass through the mount 400 and the mount 400 can rotate around the support 500. The rim 402 depends from the mount 400 and includes undulating surface 402 that complements the camming surface 304. The mount 400 has a plurality of apertures 412 for fasting the mount 400 to a display. When the mount 400 is resting on the camming surface 304 of the insert 300, it is free to rotate about the support 500 and impart up and down movement to a display carried by the mount 400.

It will be understood that the complement surfaces of the camming surface 304 and the cam following surface 402 will have a neutral or rest position when there is no rotation energy applied to them. Because the display is attached to the mount 400, this neutral or rest position will determine the orientation of the display with respect to a vertical plan through the pivot pin 291, see FIGS. 31 and 32. The number of undulations in the camming surface 304 and the cam following surface 402 can be varied according to the degree of movement desired in the display.

As shown in FIG. 32, vertically aligning the projection 305 of insert 300 with the pivot pin 291 will also vertically align the support 500 with the pivot pin 291. Also shown in FIG. 32 are the multiple orientations or positions 294-1 through 294-8 for the insert 300. Due to the mating of the projection 305 and the recess 502, the support 500 will change it rotational orientation with respect to the pivot pin 291 as the insert 300 move throughout the multiple positions. If desired, the insert may have a single projection 305 and the support may have more recesses 502.

Figure 33:
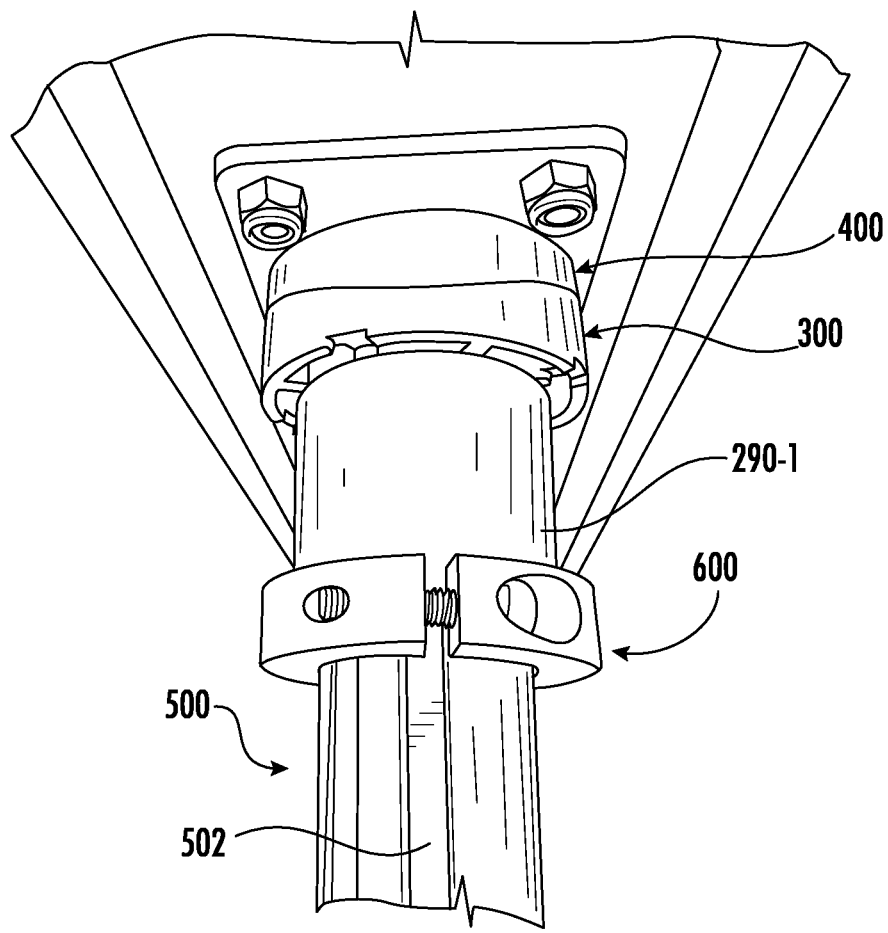
FIG. 33 illustrates the components of the support system of Figure for securing a display to the elongated support in the system.

With reference to FIG. 33, the ability to support multiple displays on the support 500 will described. In this configuration the sleeve or tubular portion 290-1 is truncated to eliminate the lower portion having the pivot pins 291 and the sleeve 290-1 will have an interior diameter that is sufficient for the support 500 to pass through. The insert 300 and mount 400 are assembled as in the prior configuration. The assembly is retained on the support 500 by the clamp 600. In this configuration for another display, it is possible to eliminate the projection 305 and use the mating non-circular interior and non-circular exterior of outer and inner sleeves to provide multiple orientations of the display.

As can be seen from the above description, a display devise with nesting components having mating non-circular geometries can provide multiple orientations by changing the position of the nesting components. As noted above, the camming surface surfaces mounted on the display enable rotation of each display about the support so that multiple displays may have different home positions on the support.

Figure 34:
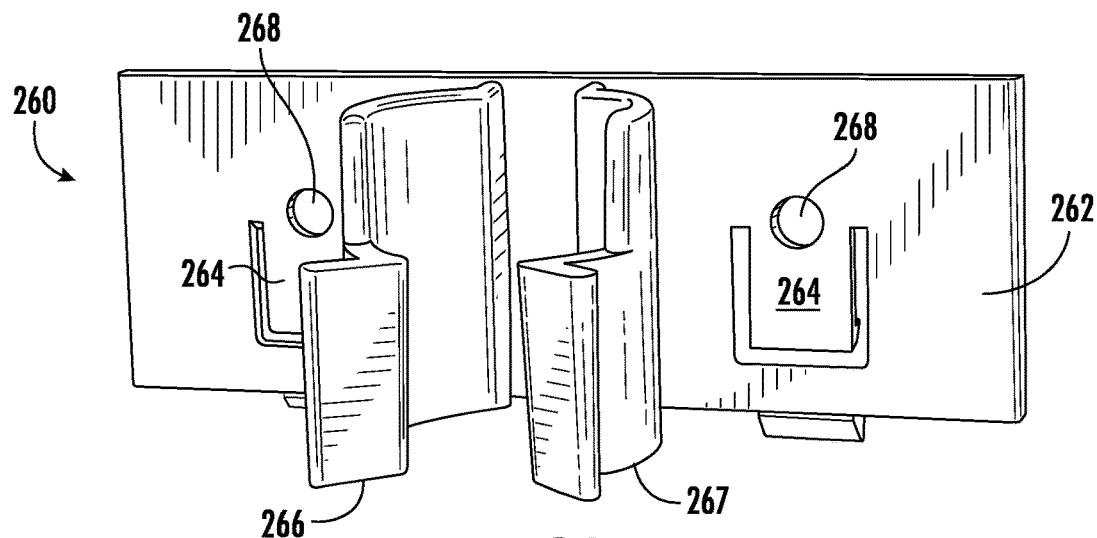
FIG. 34 is a front view of an alternative collar for holding an elongated support member.
Figure 35:
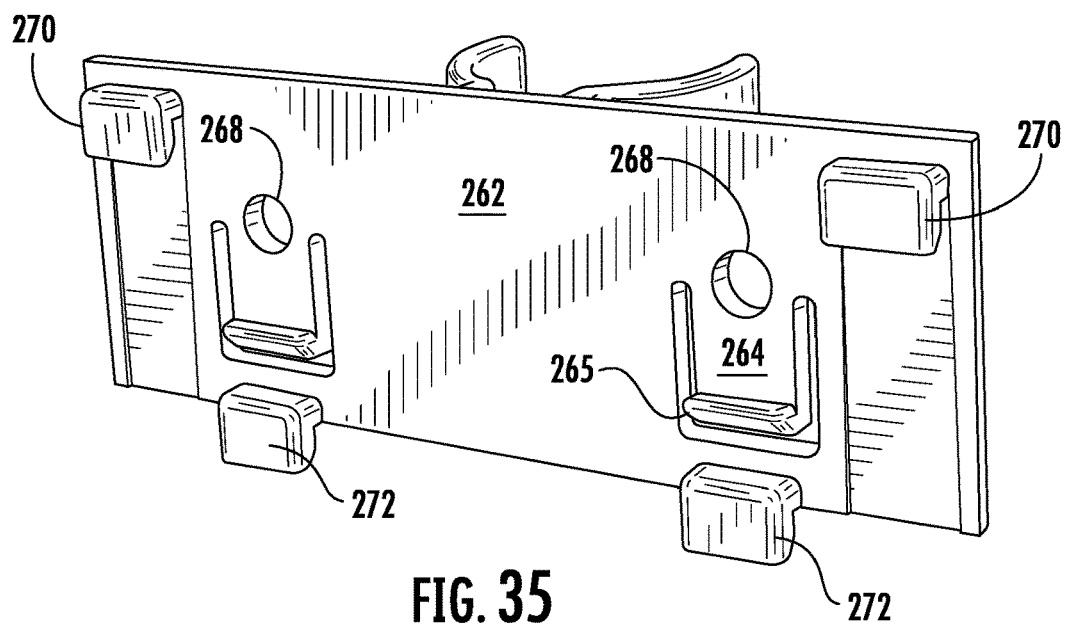
FIG. 35 is a rear view of an alternative collar in FIG. 34.
Figure 36:
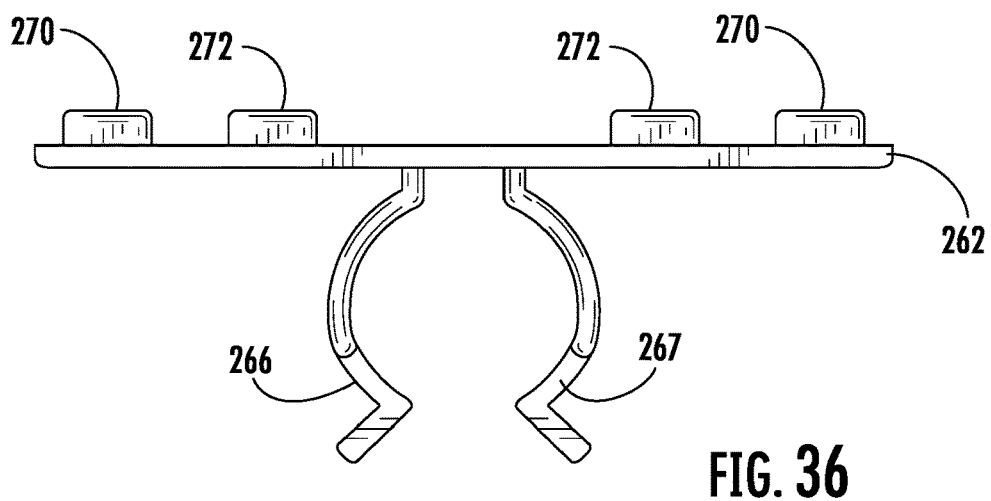
FIG. 36 is a top view of an alternative collar in FIG. 34.
Figure 34:
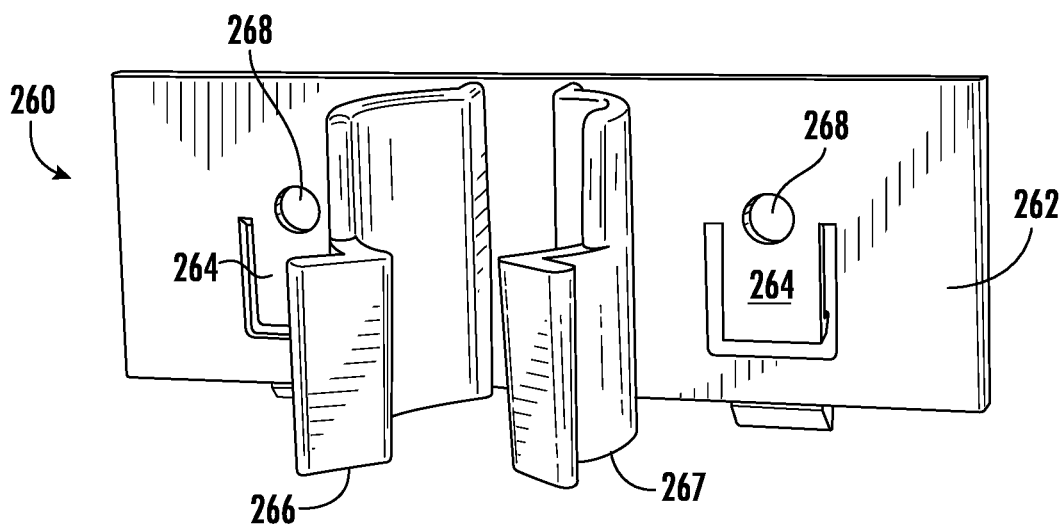
Figure 35:
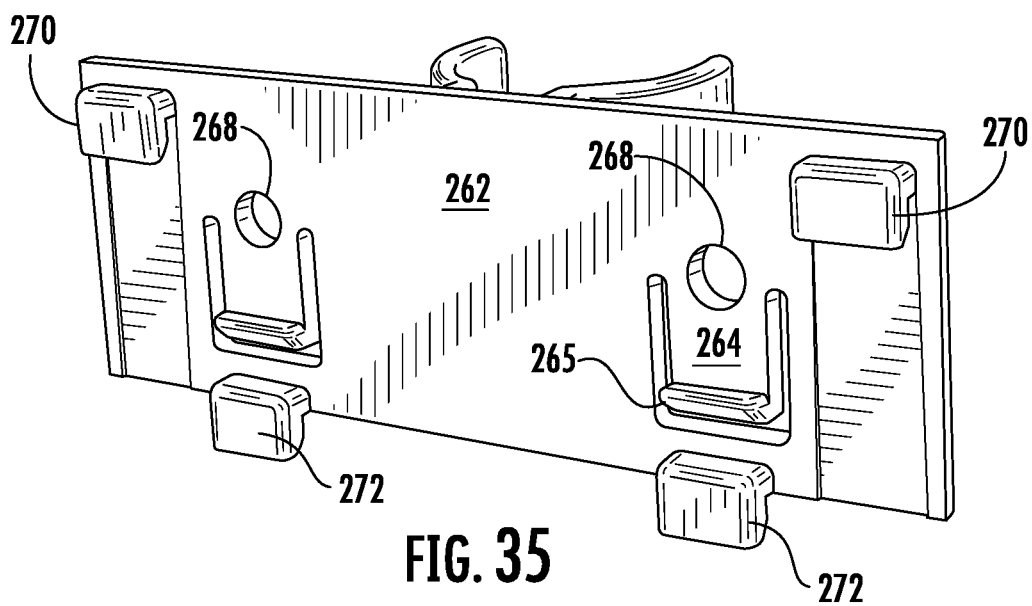
Figure 36:
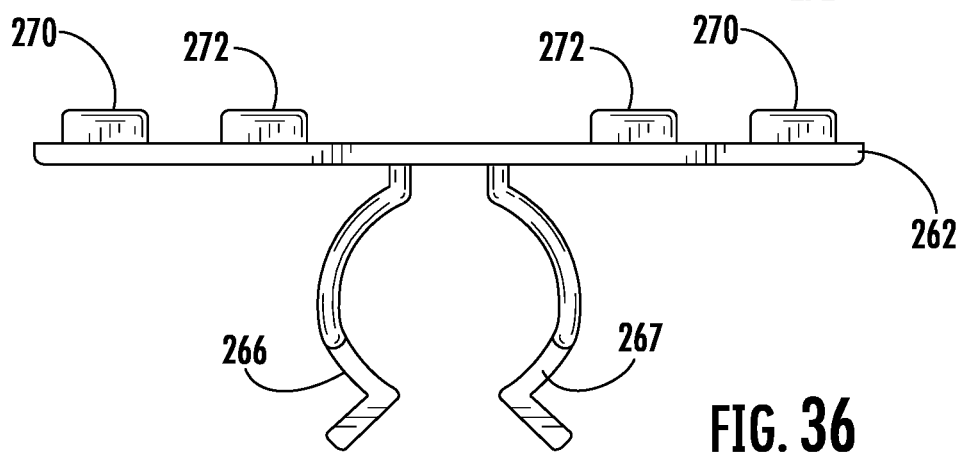
Figure 37:
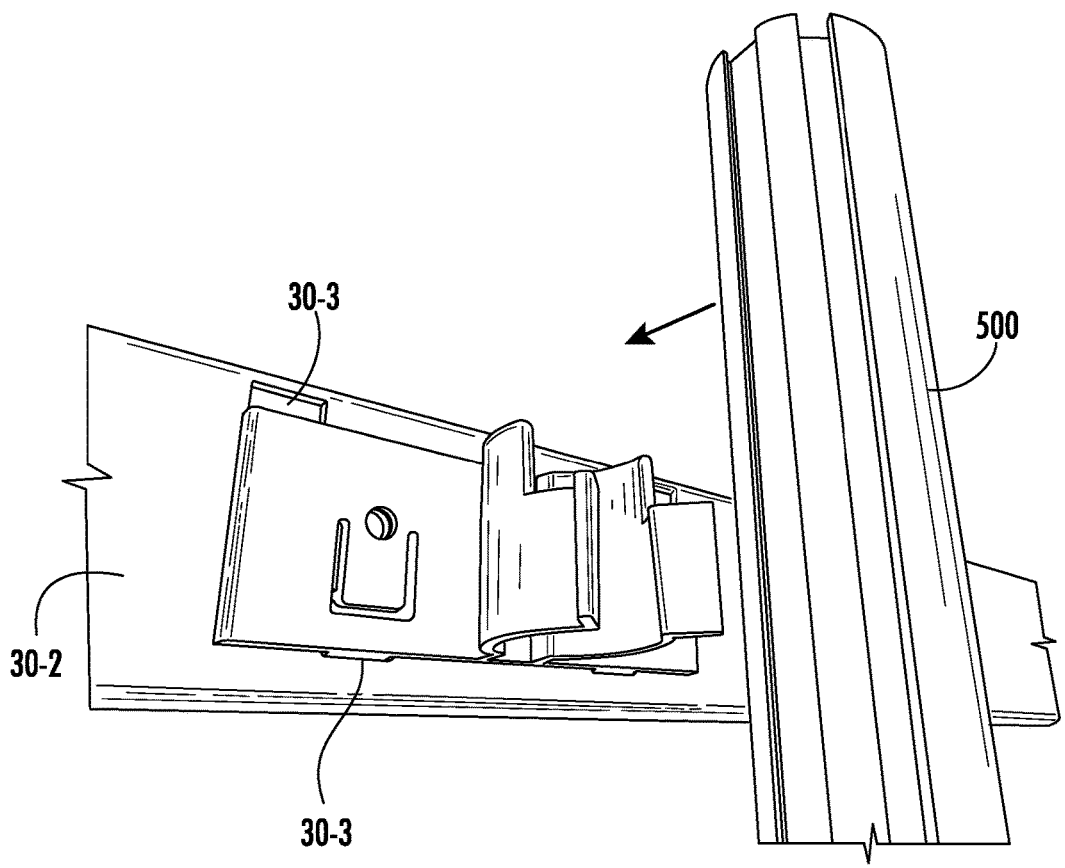
FIG. 37 illustrates the approach of the elongated support member to the alternative collar in FIG. 34.
Figure 38:
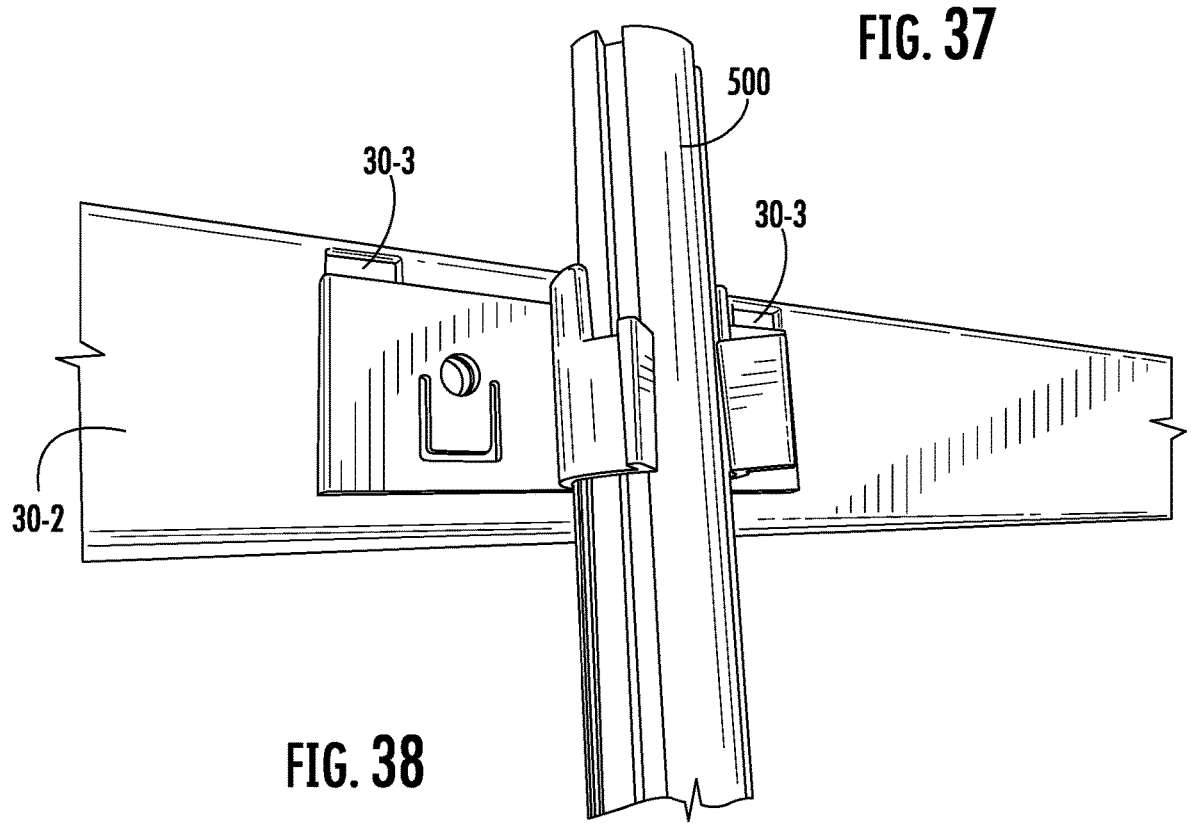
FIG. 38 illustrates the elongated support member in the alternative collar in FIG. 34; and, FIG. 39 illustrates a brace for locking the elongated support member in the alternative collar in FIG. 34.

With reference to FIGS. 34-39, there is illustrated an alternative collar structure 260 for securing the support 500 to an upper structural member. As shown in FIGS. 34-36, the structure 260 includes a back plate 262, resilient clips 264 that fit within slots in the structural member 30-2 as will be detained herein, opposed resilient arms 266 and 267, and apertures 268. As shown in FIG. 35, the reverse side of the structure 260 has upper hangers 270 and lower hangers 272 that are dimensioned to pass through slots 30-3 in the structural member 30-2 and hang on the structural member 30-2, see FIGS. 37 and 38.

Figure 39:
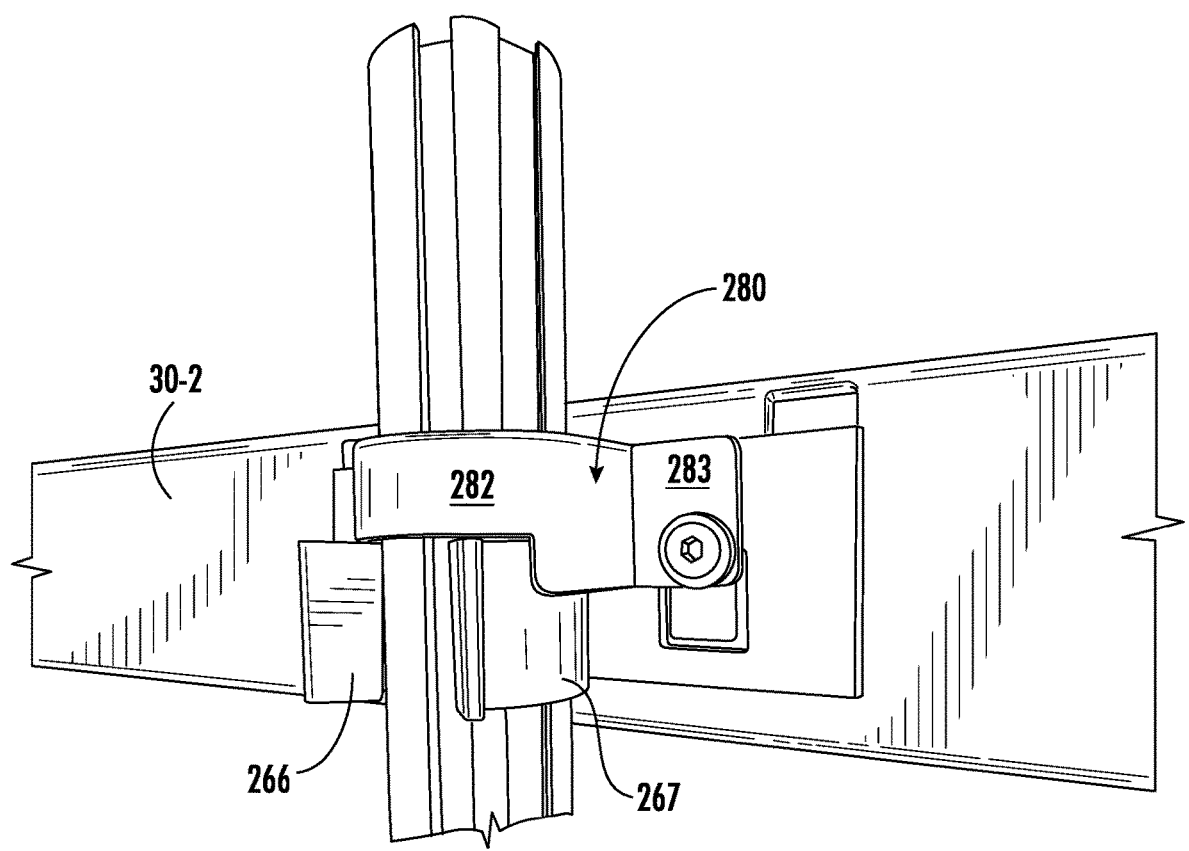

With reference to FIG. 39, there is illustrated a brace 280 for further securing the support 500 to the structural member. Although the resilient arms 266 and 267 will spring back around the support 500 after it is inserted, it is desired to prevent accidently dislodgment by a use of the display. Accordingly, the clamp or brace 280 has a circular portion 282 that will pass over the support 500 and two wing portions 283 that have apertures so that fattener may pass through them and the apertures 268 I the back plate 262 and secure the assembly to the structural member.

We claim:

1. An adjustable system for supporting a display on an elongated support member, the adjustable system comprising:
    an outer sleeve having a non-circular interior opening;
    an inner sleeve that has a non-circular exterior configured to mate with the non-circular interior opening of the outer sleeve and an open interior with at least one projection that extends into the open interior;
    a display mount that rest on the inner sleeve and has an open interior that is at least equal to the open interior of the inner sleeve; and,
    an elongated support with a first end exterior diameter that fits within the open interior of the display mount and the open interior of the inner sleeve and has at least one recess in the exterior diameter that is dimensioned to receive the at least one projection that extends into the open interior of the inner sleeve.

2. The adjustable system of claim 1, wherein the inner sleeve and the display mount have undulating mating surfaces and the inner sleeve and the display mount are free to rotate relative to each other.

3. The adjustable system of claim 1, further comprising a base having a cavity configured for receiving and securing the outer sleeve to a structural member.

4. The adjustable system of claim 1 further comprising a collar having an enclosure configured to retain a second end of the elongated support and secure the elongated support to a structural member.

5. The adjustable system of claim 4 further comprising a brace for retaining the elongated support in the collar.

6. The adjustable system of claim 5, wherein the inner sleeve and the display mount have undulating mating surfaces and the inner sleeve and the display mount are free to rotate relative to each other.

7. The adjustable system of claim 5, further comprising a base having a cavity configured for receiving and retaining the outer sleeve.

8. The adjustable system of claim 7, wherein the inner sleeve and the display mount have undulating mating surfaces and the inner sleeve and the display mount are free to rotate relative to each other.

9. The adjustable system of claim 1, wherein the outer sleeve is further comprised of a base for securing the outer sleeve to a structural member.

10. The adjustable system of claim 9 further comprising a collar having an enclosure configured to retain a second end of the elongated support and secure the elongated support to a second structural member.

11. The adjustable system of claim 1, wherein the non-circular interior opening of the outer sleeve is a polygram.

12. The adjustable system of claim 11, wherein the non-circular interior opening of the outer sleeve is a five-sided polygram.

13. The adjustable system of claim 11, wherein the non-circular interior opening of the outer sleeve is a six-sided polygram.

14. The adjustable system of claim 11, wherein the non-circular interior opening of the outer sleeve is a three-sided polygram.

15. A method for supporting an elongated member, the method comprising:
    providing an outer sleeve having a non-circular interior opening;
    providing an inner sleeve that has a non-circular exterior configured to mate with the non-circular interior opening of the outer sleeve and an open interior with at least one projection that extends into the open interior;
    providing a display mount that rest on the inner sleeve and has an open interior that is at least equal to the open interior of the inner sleeve; and,
    providing an elongated support with a first end exterior diameter that fits within the open interior of the display mount and the open interior of the inner sleeve and has at least one recess in the exterior diameter that is dimensioned to receive the at least one projection that extends into the open interior of the inner sleeve.

16. The method of claim 15 further comprising:
    providing the inner sleeve and the display mount with undulating mating surfaces whereby the inner sleeve and the display mount are free to rotate relative to each other.

17. The method of claim 15 further comprising;
    providing a base having a cavity configured for receiving and securing a first end of the outer sleeve to a structural member.

18. The method of claim 17 further comprising:
    providing a collar having an enclosure configured to retain a second end of the elongated support and secure the elongated support to a structural member.

19. An adjustable display comprising:
    an outer sleeve having a non-circular interior opening;
    an inner sleeve that has a non-circular exterior configured to mate with the non-circular interior opening of the outer sleeve and an open interior with at least one projection that extends into the open interior;

a display piece with an aperture on a first surface and an aperture on a second surface;

a display mount with a first surface that attaches to the display piece and a second surface that rest on the inner sleeve; the display mount has an interior opening at least equal to the open interior of the inner sleeve; and, an elongated support that is dimensioned to pass through the aperture on the first surface and the aperture on the second surface of the display piece;

wherein the elongated support has a first end exterior diameter that fits within the open interior of the display mount and the open interior of the inner sleeve and there is at least one recess in the exterior diameter of the elongated support that is dimensioned to receive the at least one projection that extends into the open interior of the inner sleeve.

20. The adjustable display of claim 19, wherein both the non-circular interior opening of the outer sleeve and the non-circular exterior of the inner sleeve are shaped as polygrams.

21. An adjustable display support comprising:

a base having a non-circular interior opening;

an insert that has a non-circular exterior configured to mate with the non-circular interior opening of the base and an open interior with at least one projection that extends into the open interior;

a display mount that rest on the insert and has an open interior that is at least equal to the open interior of the insert; and, an elongated support with an exterior diameter that fits within the open interior of the display mount and has at least one recess in its exterior diameter that is dimensioned to receive the at least one projection that extends into the open interior of the insert.

22. An adjustable display support comprising:

a base having a non-circular interior opening;

an insert that has a non-circular exterior configured to mate with the non-circular interior opening of the base and an open interior with at least one projection that extends into the open interior;

a display mount that rest on the insert and has an open interior that is at least equal to the open interior of the insert; and, an elongated support with an exterior diameter that fits within the open interior of the display mount, wherein one of the insert or the elongated support has at least one projection and the other of the insert or the elongated support has at least one recess that engages with the projection.

* * * * *